(12) United States Patent
Mason

(10) Patent No.: US 9,453,170 B2
(45) Date of Patent: Sep. 27, 2016

(54) HYBRID FIXED-KINETIC BED GASIFIER FOR FUEL FLEXIBLE GASIFICATION

(71) Applicant: All Power Labs, Inc., Berkeley, CA (US)

(72) Inventor: James Mason, Berkeley, CA (US)

(73) Assignee: All Power Labs, Inc., Berkeley, CA (US)

( * ) Notice: Subject to any disclaimer, the term of this patent is extended or adjusted under 35 U.S.C. 154(b) by 305 days.

(21) Appl. No.: 14/216,206

(22) Filed: Mar. 17, 2014

(65) Prior Publication Data

US 2014/0259925 A1    Sep. 18, 2014

Related U.S. Application Data

(60) Provisional application No. 61/788,611, filed on Mar. 15, 2013.

(51) Int. Cl.
*B01J 7/00* (2006.01)
*C10J 3/48* (2006.01)

(52) U.S. Cl.
CPC *C10J 3/48* (2013.01); *C10J 3/485* (2013.01); *C10J 2200/152* (2013.01); *C10J 2300/0916* (2013.01); *Y02P 20/129* (2015.11); *Y02P 20/145* (2015.11)

(58) Field of Classification Search
CPC combination set(s) only.
See application file for complete search history.

(56) References Cited

U.S. PATENT DOCUMENTS

| | | | |
|---|---|---|---|
| 2,984,602 A | 5/1961 | Nevens et al. | |
| 3,034,979 A | 5/1962 | Nevens | |
| 4,291,636 A * | 9/1981 | Bergsten | B03B 9/06 110/216 |
| 5,620,487 A * | 4/1997 | Andrus, Jr. | C10J 3/485 48/203 |
| 7,469,781 B2 | 12/2008 | Chataing et al. | |
| 8,153,850 B2 | 4/2012 | Hall et al. | |
| 8,202,399 B2 | 6/2012 | Taylor | |
| 8,546,636 B1 | 10/2013 | Potgieter et al. | |
| 2003/0024806 A1 | 2/2003 | Foret | |
| 2009/0007484 A1 | 1/2009 | Smith | |
| 2009/0294270 A1 | 12/2009 | Shuman et al. | |
| 2010/0112242 A1 | 5/2010 | Medoff | |
| 2011/0036014 A1 * | 2/2011 | Tsangaris | C01B 3/22 48/62 R |
| 2011/0232191 A1 | 9/2011 | Diebold et al. | |
| 2012/0117876 A1 | 5/2012 | Juvan | |
| 2013/0199919 A1 | 8/2013 | Li et al. | |
| 2014/0196369 A1* | 7/2014 | Wiklof | C10J 3/18 48/101 |

FOREIGN PATENT DOCUMENTS

WO    2011139181 A1    11/2011

* cited by examiner

*Primary Examiner* — Imran Akram
(74) *Attorney, Agent, or Firm* — Jeffrey Schox; Diana Lin

(57) ABSTRACT

A gasification system including: a casing defining: a solid material inlet; a fixed bed drying zone proximal the solid material inlet; a fixed bed pyrolysis zone arranged below the drying zone along a gravity vector, distal the solid material inlet across the pyrolysis zone; a kinetic bed combustion zone surrounded by the pyrolysis zone; and a kinetic channel extending through the drying zone and pyrolysis zone and fluidly connected to the combustion zone, the kinetic channel defining a kinetic bed reduction zone fluidly isolated from and thermally connected to the pyrolysis zone and the drying zone by the kinetic channel.

14 Claims, 14 Drawing Sheets

HYBRID FIXED-KINETIC BED GASIFIER FOR FUEL FLEXIBLE GASIFICATION

CROSS-REFERENCE TO RELATED APPLICATIONS

This application claims the benefit of U.S. Provisional Application No. 61/788,611 filed 15 Mar. 2013, which is incorporated in its entirety by this reference. This application is related to U.S. application Ser. No. 14/216,321 filed 17 Mar. 2014, titled Simultaneous Pyrolysis and Communition for Fuel Flexible Gasification and Pyrolysis, which is incorporated in its entirety by this reference.

TECHNICAL FIELD

This invention relates generally to the gasification field, and more specifically to a new and useful fuel flexible gasifier in the gasification field.

BACKGROUND

Biomass gasification-based generators are an attractive method for power generation, as these gasifiers are fueled with carbonaceous byproducts that are inexpensive and often free to source. However, these potentially useful byproducts come in all shapes and sizes, and gasifiers are typically highly sensitive to fuel particulars. Gasifiers usually will not operate properly on fuel larger or smaller than a predetermined range. Therefore, gasifier operation typically involves a great deal of fuel pre-processing, whether by chopping material down to a desired size through chippers or shredders, or building the material up to the threshold size via a densification process.

Typical fixed bed downdraft gasifiers are relatively simple and are capable of making engine grade syngas, but can only do so with large chunk fuel. If fed a fine grain fuel, fixed bed gasifiers tend to have problems with tar, as well as problems with mechanical packing in the reduction zone (gasification zone). Kinetic bed gasifiers, such as fluidized beds or cyclonic reactors, can mechanically process fine fuels. However, kinetic bed gasifiers mix all the gasification zones together, and produce a tarry gas that requires downstream cleanup. Kinetic bed reactors also tend to be very large and complicated, requiring elaborate controls and multiple vessels.

What is needed is a gasifier that can, over a wide range of fuel sizes, maintain good zone separation for low tar gas, simultaneous with good mechanical handling and through-flow, and do so at relatively low cost and complexity. In particular, a gasifier that can produce low tar syngas from fine fuels would be particularly valuable, as biomass byproducts are most commonly found in smaller sizes, and reducing biomass size is much easier than increasing biomass size through densification. Thus, there is a need in the field for a new gasifier design that will produce engine grade gas from small fuels without the complication of previous systems. There is an even greater need for a new gasifier design that will produce engine grade gas from any shape or size fuel, approximating a fuel agnostic gasifier, and do so with low system complexity, minimized size, and ease of operation for the user. This invention provides such new and useful gasifier.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Hybrid Gasifier

Figure 1:
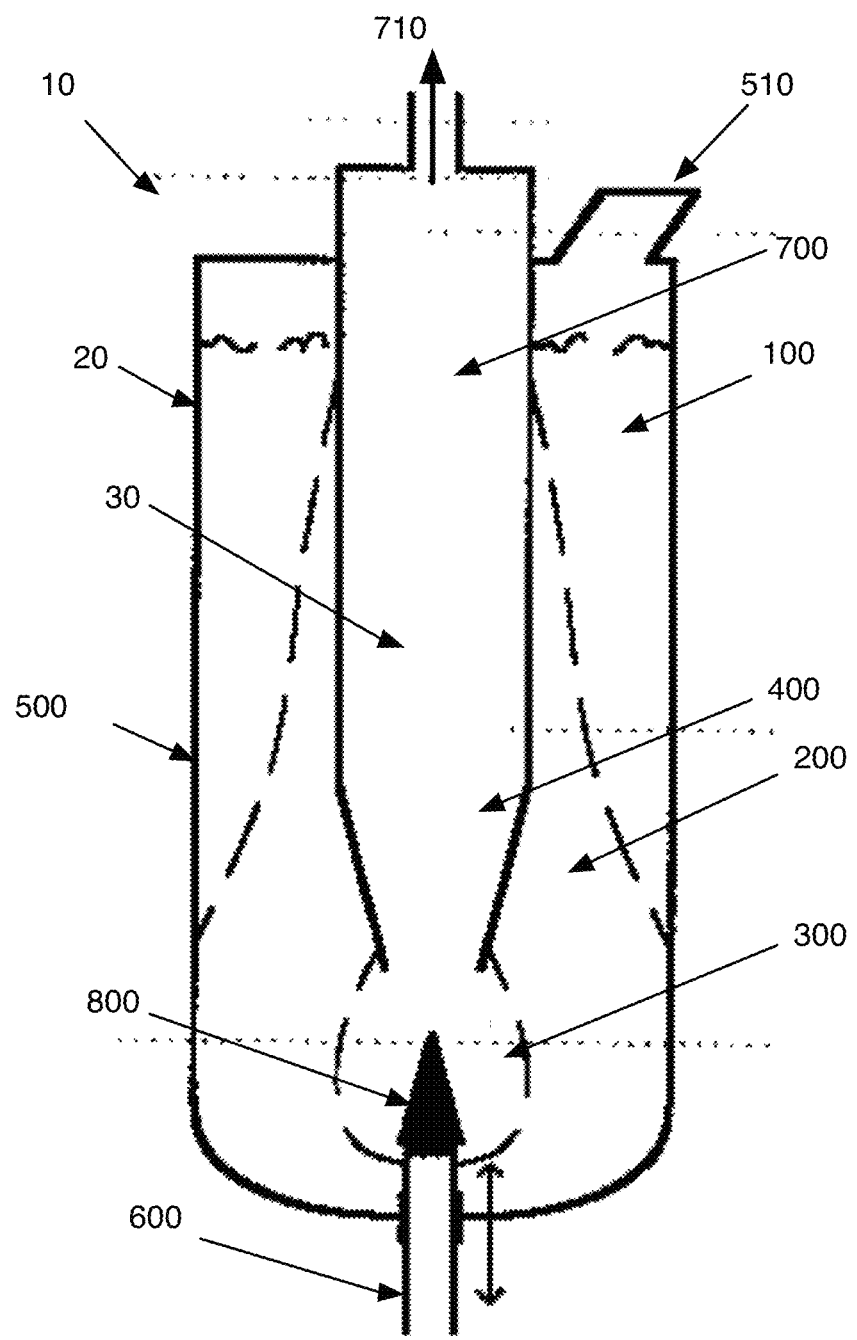
FIG. 1 is a variation of the hybrid gasifier.

As shown in FIG. 1, the hybrid gasifier 10 includes a fixed bed drying zone 100, a fixed bed pyrolysis zone 200, a kinetic bed combustion zone 300, and a kinetic bed reduction zone 400. The hybrid gasifier 10 preferably additionally includes an air manifold 600 and a burner 800 fluidly connected to the combustion zone 300. The hybrid gasifier 10 configuration preferably enables a zone-separated, granular fuel handling gasifier. The hybrid gasifier 10 preferably receives and converts carbonaceous material 11 (biomass) into syngas 12 (synthetic gas) through the successive stages of drying the biomass, pyrolysizing the biomass, combusting and cracking the resultant tar gasses, and reducing (reacting) the combusted tar gasses with fluidized char. The hybrid gasifier 10 can be utilized within a generator system, wherein the hybrid gasifier 10 can fuel an engine-generator system 50 that converts the syngas into electric power. However, the hybrid gasifier 10 can be used to produce flammable gas, biochar 13, bio oil, or within any other suitable system that utilizes the products of gasification.

This hybrid gasifier 10 confers several benefits by using a kinetic bed for the gasification phases in which void spaces or gas flow (between solid particles) is advantageous and using a fixed bed 20 for the gasification phases in which void spaces or gas flow is not required. First, this gasifier passively self-regulates the biomass feed rate, wherein gravity pulls dried biomass into the pyrolysis zone 200, and the suction created by the engine or a blower pulls and suspends the desired amount of material from the pyrolysis zone 200 into the combustion zone 300 and subsequently, the reduction zone 400. This passive control eliminates the need for powered biomass feeders and biomass control systems. Second, by using a kinetic bed 30 for the combustion and reduction phase, this gasifier overcomes the biomass size limitation on fixed bed gasifiers by enabling gas flow through the particulates during combustion and reduction. This gasifier can additionally increase the cracking efficiency by separating the tar gas from the char in the combustion zone 300, via use of a dedicated combustion and cracking chamber. By substantially separating the tar gas combustion from the presence of char, the gasifier reduces the post-combustion cooling effects of char reduction, thereby achieving a more preferential tar cracking temperature and residence time. Third, this gasifier has increased thermal efficiency over conventional gasifiers. In the hybridized gasifier, the kinetic and fixed beds are adjacently arranged, more preferably annularly arranged, such that waste heat radiating or conducted out of the high-temperature phases in the kinetic bed are used to heat the phases in the fixed bed. Fourth, possible inclusion of a char grinder between the pyrolysis and combustion zones can normalize the biomass size with a smaller amount of energy input than biomass size reduction achieved through dedicated cutting machines pre-gasifier. The char grinder also results in more uniform pyrolysis of the biomass with lower pyrolysis temperatures and/or less heat energy input. During conventional pyrolysis, a thermally insulative layer of char on the biomass exterior typically slows further pyrolysis of the biomass interior, results in significant temperature differentials between the interior and exterior potions of the biomass. Continual abrading effectively removes the thermally insulative layer of char as it forms, usefully exposing new surface of raw biomass. Fifth, the possible inclusion of an internal particulate separator within the kinetic bed can minimize particulate carryover into the egressing gas stream, thereby minimizing the size and extent of required filtration systems. Sixth, use of a cyclonic kinetic bed can enable non-vertical orientation of the gasifier. Seventh, the entire hybrid gasifier 10 can be achieved within a single vessel, resulting in a compact and easy to manufacture design.

The hybrid gasifier 10 preferably includes a continuous fixed bed defining the drying zone 100 and pyrolysis zone 200 and a continuous kinetic bed defining the combustion zone 300 and reduction zone 400. More preferably, the hybrid gasifier 10 includes a fixed bed sequentially defining the drying zone 100 and the pyrolysis zone 200 along a gravity vector and a kinetic bed sequentially defining the combustion zone 300 and reduction zone 400 in a direction opposing the gravity vector. However, the drying zone 100 and pyrolysis zone 200 can be defined by separate fixed beds, and the combustion zone 300 and reduction zone 400 can be defined by separate kinetic beds. The fixed bed 20 preferably surrounds and encapsulates the kinetic bed 30, wherein the kinetic bed 30 is preferably coaxially arranged within the fixed bed but can alternatively be offset from the fixed bed 20. The kinetic bed 30 is preferably defined by a channel 700 within the container (casing 500), wherein the container defines the fixed bed 20, but can alternatively be otherwise defined. Alternatively, the kinetic bed 30 can surround and encapsulate the fixed bed 20. The kinetic bed 30 can be otherwise arranged relative to the fixed bed 20. The kinetic bed 30 can be a fluidized bed, cyclonic bed, centrifugal fluidized bed, or any other suitable kinetic bed. The hybrid gasifier 10 is preferably fluidly sealed, such that pyrolysis in the absence of oxygen can be achieved. However, the hybrid gasifier 10 can alternatively be an open system (e.g., wherein the biomass inlet does not include a fluid seal), wherein the mass of biomass within the drying zone 100 functions as a substantially fluid impermeable barrier for pyrolysis.

The drying zone 100 of the gasifier 10 functions to receive and dry wet biomass. The drying zone 100 is preferably a fixed bed, wherein fluid is preferably not flowed therethrough. The drying zone 100 preferably receives wet biomass and feeds dried biomass into the pyrolysis zone 200. The drying zone 100 is preferably fluidly connected to and receives material from a material inlet 510 (biomass or fuel inlet) that receives the wet biomass. The material inlet 510 is preferably arranged distal the pyrolysis zone 200, preferably at the top of the drying zone 100 (e.g., point most distal the pyrolysis zone 200) but alternatively along the side of the drying zone 100 or at any other suitable position. The drying zone 100 can additionally be fluidly connected to a vent or a condenser that removes evaporated water from the biomass, wherein the condenser preferably condenses water vapor away from the biomass. The drying zone 100 is preferably arranged with a longitudinal axis parallel to a gravity vector, but can alternatively be arranged with a longitudinal axis perpendicular to the gravity vector, at an angle to the gravity vector, or arranged in any suitable position. Material flow or movement through the drying zone 100 preferably follows and is parallel to the gravity vector, with the dryer outlet arranged vertically below the material inlet 510 (e.g., along the gravity vector), but can alternatively move material perpendicular to the gravity vector, move material at an angle to the gravity vector, or move material in any suitable direction. The drying zone 100 is preferably arranged adjacent to the reduction zone 400, but can alternatively be arranged elsewhere. More preferably, the drying zone 100 is thermally connected to and fluidly isolated from the reduction zone 400, wherein waste heat from the reduction zone 400 (e.g., waste heat from partially cooled combustion products and/or combustion product reduction) is preferably conducted or radiated through the walls defining the reduction zone 400 to dry the biomass held within the drying zone 100.

The drying zone 100 can additionally be fluidly connected to the air manifold 600 by a tar gas manifold 530 that transports tar gas from the drying zone 100 to the air manifold 600. The tar gas manifold 530 preferably fluidly connects the air manifold 600 to a portion of the casing 500 proximal the material inlet 510. The tar gas manifold 530 preferably fluidly connects to the air manifold 600 upstream of the guide 650, but can alternatively fluidly connect to the guide 650 or to any other suitable portion of the air manifold 600. The tar gas manifold 530 can extend through or along the gasifier zones, such that waste heat from the zones heat the tar gas, or can extend along an exterior of the gasifier such that the tar gasses are cooled prior to introduction to the air manifold 600.

The pyrolysis zone 200 of the gasifier functions to pyrolyze the dried biomass into char and tar gas. The pyrolysis zone 200 preferably receives dried biomass from the drying zone 100 and feeds the pyrolyzed biomass (in the form of char and tar gasses) into the combustion zone 300. The pyrolysis zone 200 is preferably a fixed bed, wherein fluid is preferably not substantially forced therethrough. The pyrolysis zone 200 is preferably arranged with a longitudinal axis parallel to a gravity vector, but can alternatively be arranged with a longitudinal axis perpendicular the gravity vector, at an angle to the gravity vector, or arranged in any suitable position. Material flow or movement through the pyrolysis zone 200 preferably follows and is parallel to the gravity vector, with the pyrolysis outlet arranged vertically below the pyrolysis inlet (e.g., along the gravity vector), but can alternatively move material perpendicular to the gravity vector, move material at an angle to the gravity vector, or move material in any suitable direction. The pyrolysis zone 200 is preferably arranged adjacent the combustion zone 300, but can alternatively be arranged elsewhere. More preferably, the pyrolysis zone 200 surrounds and is thermally connected to the reduction zone 400, wherein waste heat from the reduction zone 400 (e.g., waste heat from combustion and/or combustion product reduction) is preferably conducted or radiated from the reduction zone 400 to pyrolyze the biomass held within the pyrolysis zone 200.

The drying zone 100 is preferably fluidly connected to the pyrolysis zone 200, and is more preferably substantially continuous with the pyrolysis zone 200. In one variation of the gasifier, the drying zone 100 is arranged coaxially above the pyrolysis zone 200 (e.g., the pyrolysis zone 200 is arranged beneath the drying zone 100 along a gravity vector), such that dried material is pulled from the drying zone 100 into the pyrolysis zone 200 by gravity. In one specific example of the variation, the drying zone 100 and pyrolysis zone 200 are defined within a singular fixed bed, wherein the drying zone 100 is defined at a first end of the fixed bed and the pyrolysis zone 200 is defined at the second end of the fixed bed. The fixed bed is preferably defined within a casing 500, wherein the casing 500 is preferably oriented vertically (e.g., having a longitudinal axis parallel to a gravity vector) but can be oriented at any other suitable angle. The casing 500 is preferably a tube or annular channel surrounding the reaction and combustion zones, but the fixed bed can alternatively be an insert that is inserted into the reaction and/or combustion zones. In another variation of the gasifier, the drying zone 100 is arranged adjacent the pyrolysis zone 200, wherein a transportation mechanism (e.g., a belt, elevator, etc.) moves the biomass from the drying zone 100 to the pyrolysis zone 200. However, the drying zone 100 and pyrolysis zone 200 can be otherwise arranged and connected.

The combustion zone 300 of the gasifier functions to combust and crack the tar gasses produced by the pyrolysis zone 200. The combustion zone 300 preferably receives tar gasses from the pyrolysis zone 200, combusts the tar gasses with air received from an air manifold 600, cracks any excess uncombusted tar gas, and flows the resulting gasses to the reduction zone 400. The combustion zone 300 can additionally receive char from the pyrolysis zone 200. The combustion zone 300 is preferably a kinetic bed, wherein gas is preferably forced therethrough. The combustion zone 300 is preferably separated from the fixed bed, and is preferably substantially isolated from the char within the fixed bed and the kinetic bed. The combustion zone 300 is more preferably a separate open volume, removed from the char bed, whereby combustion and cracking can proceed without interaction with the char bed until returning to the bed for reduction. However, the combustion zone 300 can be substantially continuous with the fixed bed. Gas flow through the combustion zone 300 preferably functions to ensure adequate mixing of air and tar gasses and to move the combusted and cracked gasses and/or char particles toward the reduction zone 400. The gas flow rate through the combustion zone 300 is preferably determined by the suction created by a gas-consuming engine (e.g., wherein the induced vacuum pulls air into the system), the suction created by a suction fan, the rate of air introduction into the combustion zone 300, wherein a pump, fan, or other fluid transporter preferably controls the rate of air introduction. The combustion zone 300 is preferably oriented with a longitudinal axis parallel to a gravity vector, but can alternatively be arranged with a longitudinal axis perpendicular the gravity vector, at an angle to the gravity vector, or arranged in any suitable position. The combustion zone 300 is preferably arranged proximal the pyrolysis zone 200, more preferably within the pyrolysis zone 200 (e.g., wherein the pyrolysis zone 200 encapsulates a substantial portion of the combustion zone 300). The combustion zone 300 is preferably thermally insulated such that high combustion temperatures can be achieved, wherein waste heat for pyrolysis is preferably only sourced from the reduction zone 400 losses. However, waste heat for pyrolysis can additionally be sourced from the combustion zone 300. The combustion zone 300 is preferably arranged proximal the reduction zone 400, more preferably below the reduction zone 400 (e.g., arranged below the reduction zone 400 along a gravity vector), wherein the gas flow into the combustion zone 300 preferably carries the cracked tar gasses and/or char into the reactor zone. However, the combustion zone 300 can be otherwise arranged relative to any other suitable gasifier stage.

Figure 2:
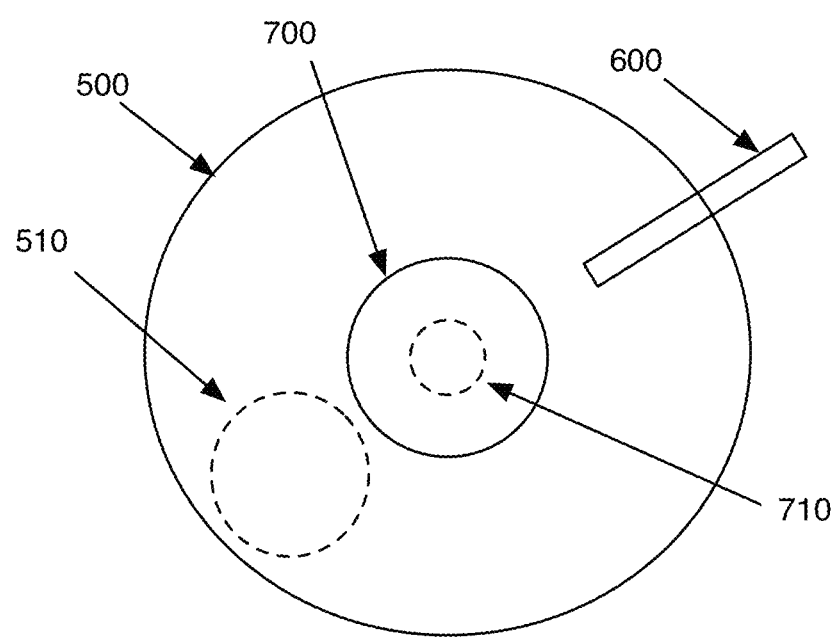
FIG. 2 is a top-down view of a variation of the hybrid gasifier.
Figure 3:
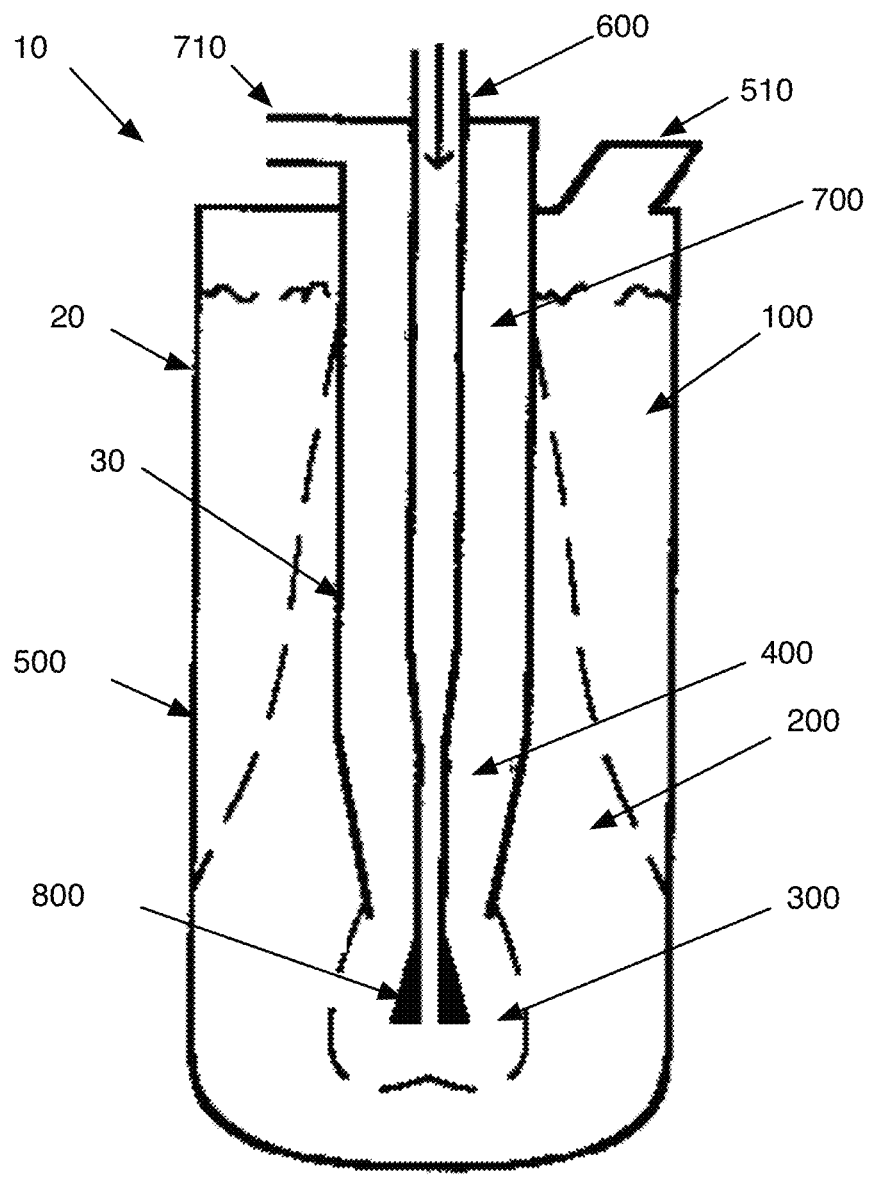
FIG. 3 is a second variation of the hybrid gasifier.
Figure 4:
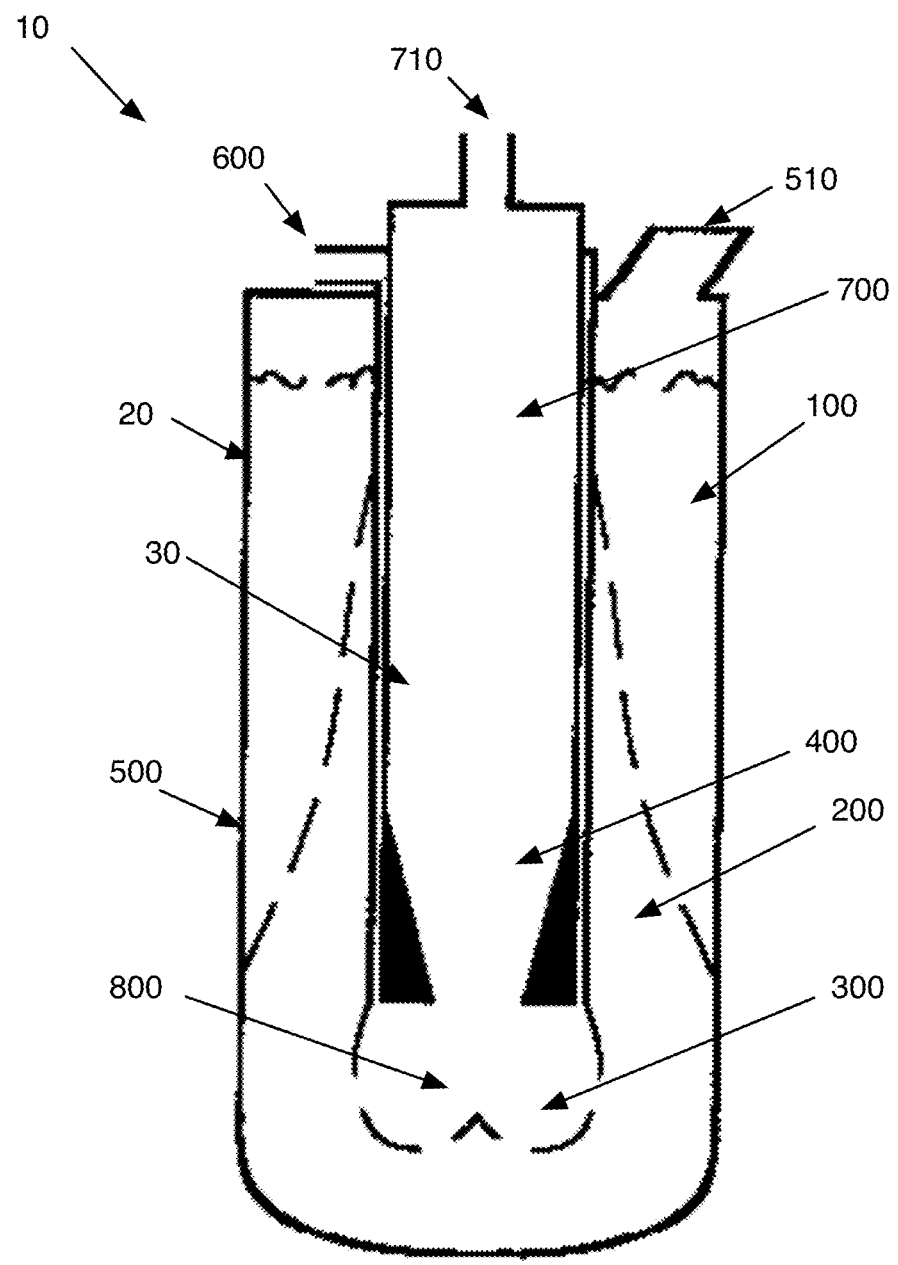
FIG. 4 is a third variation of the hybrid gasifier.

The combustion zone 300 can be a fluidized combustor or a swirl combustor. As shown in FIGS. 1, 2, and 3, the fluidized combustor preferably defines an airflow path that is directed substantially parallel to the longitudinal axis of the combustion zone 300. In one variation of the fluidized combustor, as shown in FIG. 1, the airflow path is directed upward toward the reduction zone 400, wherein the air manifold 600 extends from the bottom of the gasifier. In this variation, the air inlet 610 is preferably arranged below the pyrolysis zone 200, and the air outlet 630 can be arranged within the pyrolysis zone 200 and/or extend through the pyrolysis zone 200 to an isolated combustion zone 300. In another variation of the fluidized combustor as shown in FIGS. 2 and 3, the air manifold 600 can extend from the top of the gasifier (proximal the drying zone 100 and/or reduction zone 400) toward the bottom of the gasifier (proximal the pyrolysis zone 200 and/or combustion zone 300), wherein air within the air manifold 600 can be pre-heated with waste heat from the gasification phases en route to the combustion zone 300. The air manifold 600 can extend through the body of a gasification zone (e.g., through the reduction zone 400) as shown in FIG. 3 or along the interface between adjacent gasification zones (e.g., between the reduction zone 400 and the drying zone 100 and/or pyrolysis zone 200) as shown in FIG. 4. The airflow path of this variation is preferably boustrophedonic, wherein the air preferably flows toward the combustion zone 300 within the air manifold 600, is turned around by a casing 500 or the fixed bed of the pyrolysis zone 200, and flows back toward the air inlet 610, through the combustion zone 300 and reduction zone 400, after exiting the air manifold 600. The air outlet 630 is preferably located at the junction of the reduction zone 400 and combustion zone 300, but can alternatively be located at the end of the combustion zone 300 distal the reduction zone 400. The air inlet 610 is preferably located distal the combustion zone 300, more preferably proximal the drying zone 100 and/or reduction zone 400, but can alternatively be located elsewhere. The air inlet 610 is preferably substantially coaxial with the air channel, but can alternatively extend from the air channel at an angle (e.g., a right angle, wherein the air inlet 610 extends perpendicular to a gasifier longitudinal axis). The fluidized combustor preferably includes a single air manifold 600 with a single air inlet 610 and a single air outlet 630, but can alternatively include any suitable number of air manifolds 600, air inlets 610, or air outlets 630.

Figure 5:
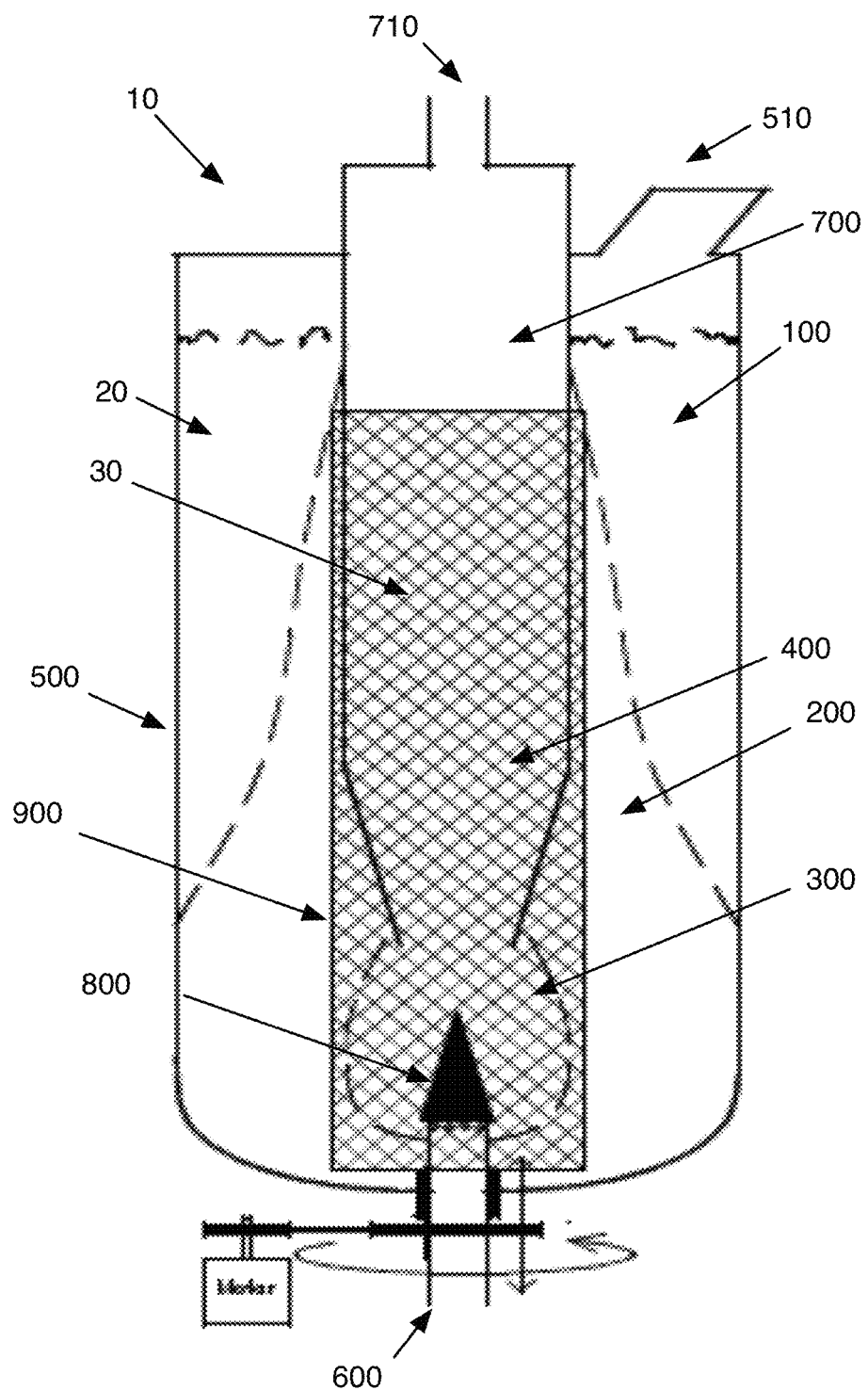
FIG. 5 is a first variation of the hybrid gasifier with a char grinder.
Figure 7:
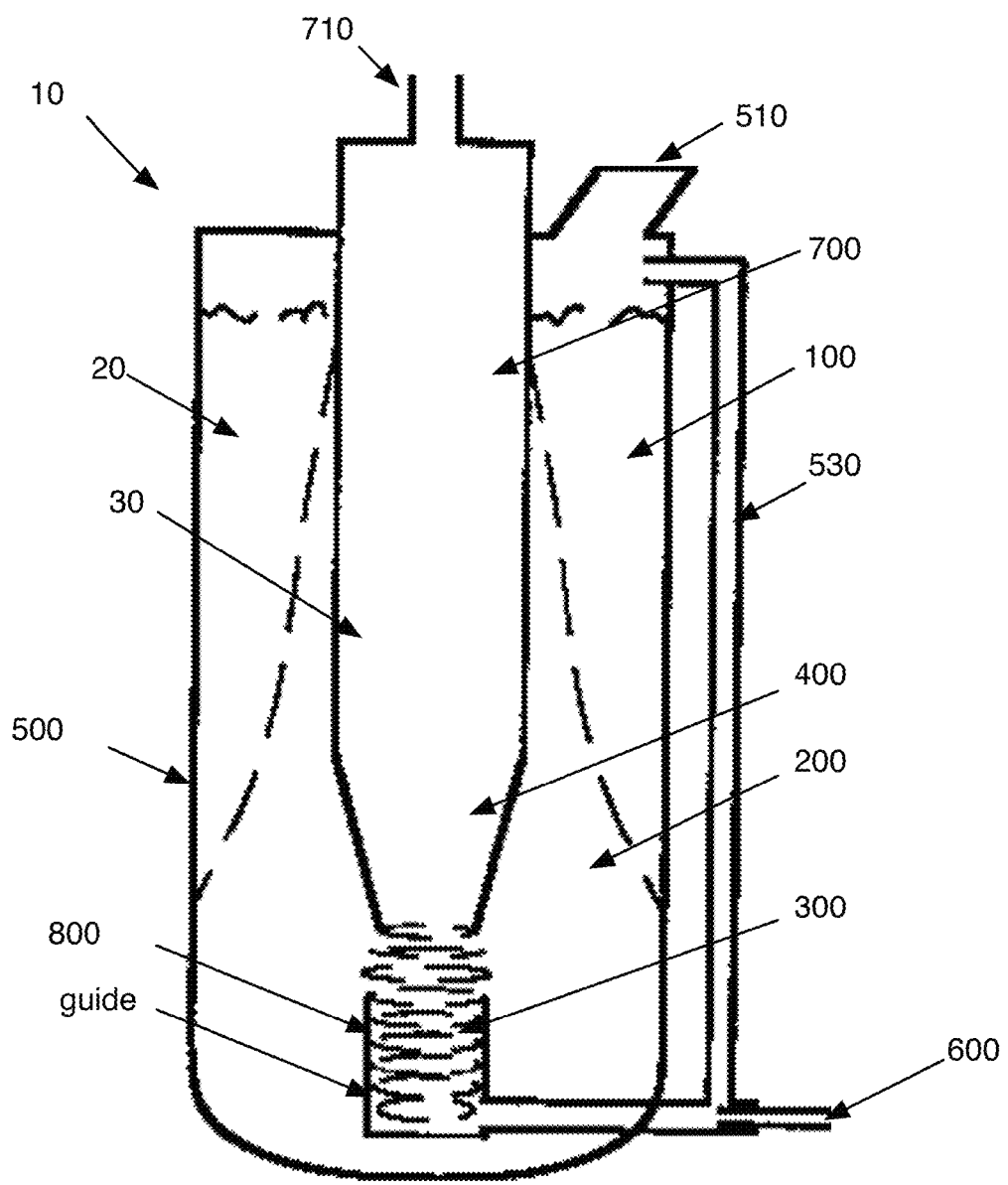
FIG. 7 is a fifth variation of the hybrid gasifier.
Figure 8:
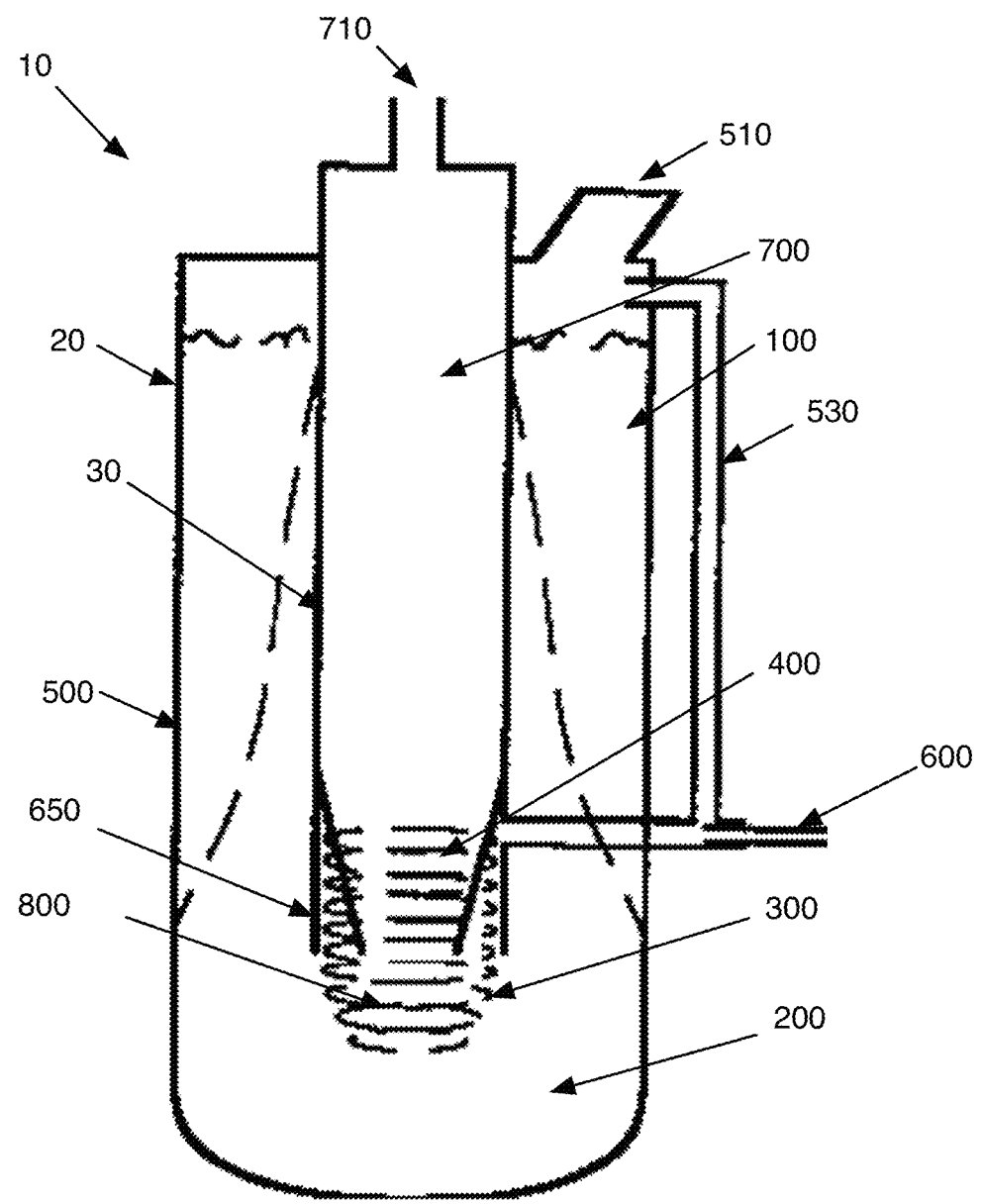
FIG. 8 is a sixth variation of the hybrid gasifier.

As shown in FIGS. 4 and 5, the swirl combustor preferably defines an airflow path that substantially revolves about the longitudinal axis of the combustion zone 300. A swirl combustor can be preferable over conventional combustors because the swirl combustor can improve the mixing throughout the entrained fluid (e.g., tar gasses, air and/or char), increase the residence time within the combustion zone 300 due to the increased fluid path, and increase reaction density due to the circular fluid path. The swirled airflow within the swirl combustor can be generated for the combustion zone 300 only, or can be generated for both the combustion zone 300 and the reduction zone 400 such that the swirled airflow extends from the combustion zone 300 into the reduction zone 400 (e.g., cyclonic bed). The air channel is preferably substantially straight, but can alternatively be curved. The air channel preferably extends perpendicular to longitudinal axis of the combustion zone 300 and terminates in a side of the gasifier, but can alternatively extend parallel to the longitudinal axis of the combustion zone 300, wherein the air channel extends through gasification zones (e.g., through the reduction zone 400) or extends along the interface between the gasification zones (e.g., between the reduction zone 400 and drying zone 100). The swirl combustor preferably additionally includes a guide 650 (air guide 650) that forms a swirl chamber that guides airflow in a swirl pattern about the longitudinal axis of the combustion zone 300. The guide 650 is preferably substantially cylindrical, but can alternatively be conical or have any other suitable form factor. The guide 650 preferably includes a closed end and an open end, wherein the air outlet 630 is preferably arranged proximal the closed end. The open end of the guide 650 is preferably arranged proximal the reduction zone 400. The closed end of the guide 650 can be arranged distal the reduction zone 400 (as shown in FIG. 7) or arranged proximal the reduction zone 400 (as shown in FIG. 8). In one variation of the system, the closed end of the guide 650 is sealed against a side of the kinetic channel 700 (e.g., against the outer wall of the kinetic channel, between the first and second ends, but alternatively against the inner wall of the kinetic channel). In another variation of the system, the closed end of the guide 650 is independent from the kinetic channel. The combustion zone 300 is preferably defined between the closed end of the guide 650 and the reduction zone 400. The air outlet 630 is preferably defined along a side of the guide 650 or extends as a nozzle from the guide 650 into the combustion zone 300. The air outlet 630 is preferably proximal the closed end of the guide 650, but can alternatively be between the closed end and the open end of the guide 650 or proximal the open end of the guide 650. Air is preferably introduced tangential to a radial vector extending from the longitudinal axis of the combustion zone 300, the longitudinal axis of the kinetic channel, or the longitudinal axis of the guide 650. The radial vector can be a normal vector to the longitudinal axis of the combustion zone 300 or be any other suitable vector having an angle between 0° and 180° to the respective longitudinal axis (e.g., air is introduced at an angle between vectors parallel to the longitudinal axis). The air outlet 630 is preferably configured to introduce fluid into the guide 650 at a non-normal angle to a side of the guide 650 extending between the closed end and the open end. The air outlet 630 can be angled upward (e.g., oppose a gravity vector at an angle), angled downward (e.g., follow a gravity vector at an angle), or angled perpendicular to a gravity vector or the longitudinal axis. The swirl combustor preferably includes multiple air manifolds 600, each having an air inlet 610, air channel, and an air outlet 630, that are radially distributed about the perimeter of the guide 650. However, the swirl combustor can include any suitable number of air manifolds 600 having any suitable configuration. The swirl combustor can additionally include a rotary airflow mechanism (e.g., a fan) that induces the swirled airflow.

In one variation of the gasifier as shown in FIG. 7, the swirl combustor defines a uni-directional flow path, wherein the air flows from the air manifold 600 toward the reduction zone 400 without changing longitudinal direction. The combustion zone 300 is preferably defined between the closed end of the guide 650 and the reduction zone 400. In another variation of the gasifier as shown in FIG. 8, the swirl combustor defines a bi-directional flow path, wherein the air preferably flows from the air manifold 600 away from the reduction zone 400, is turned by an end of the gasifier or the fixed bed of the pyrolysis zone 200, and flows toward the reduction zone 400. The combustion zone 300 is preferably defined along the perimeter of the guide 650 lumen and along the air path proximal the longitudinal axis of the guide 650, after the air path has turned back toward the reduction zone 400. The combustion zone 300 can additionally be defined in the area proximal the open end of the guide 650 contiguous with the pyrolysis zone 200.

The combustion zone 300 can be continuous with the pyrolysis zone 200 (continuous combustion zone 300) or be separate (e.g., materially isolated from the char) from the pyrolysis zone 200 (separated combustion zone 300). In the continuous combustion zone 300, the air manifold 600 terminates within a portion of the pyrolysis zone 200 such that air and heat are introduced directly into the pyrolysis zone 200, fluidizing and combusting the tar gas and char within the portion of the pyrolysis zone 200 downstream from the air manifold 600. The continuous combustion zone 300 can be used with a fluidized combustor or a swirl combustor.

Figure 6:
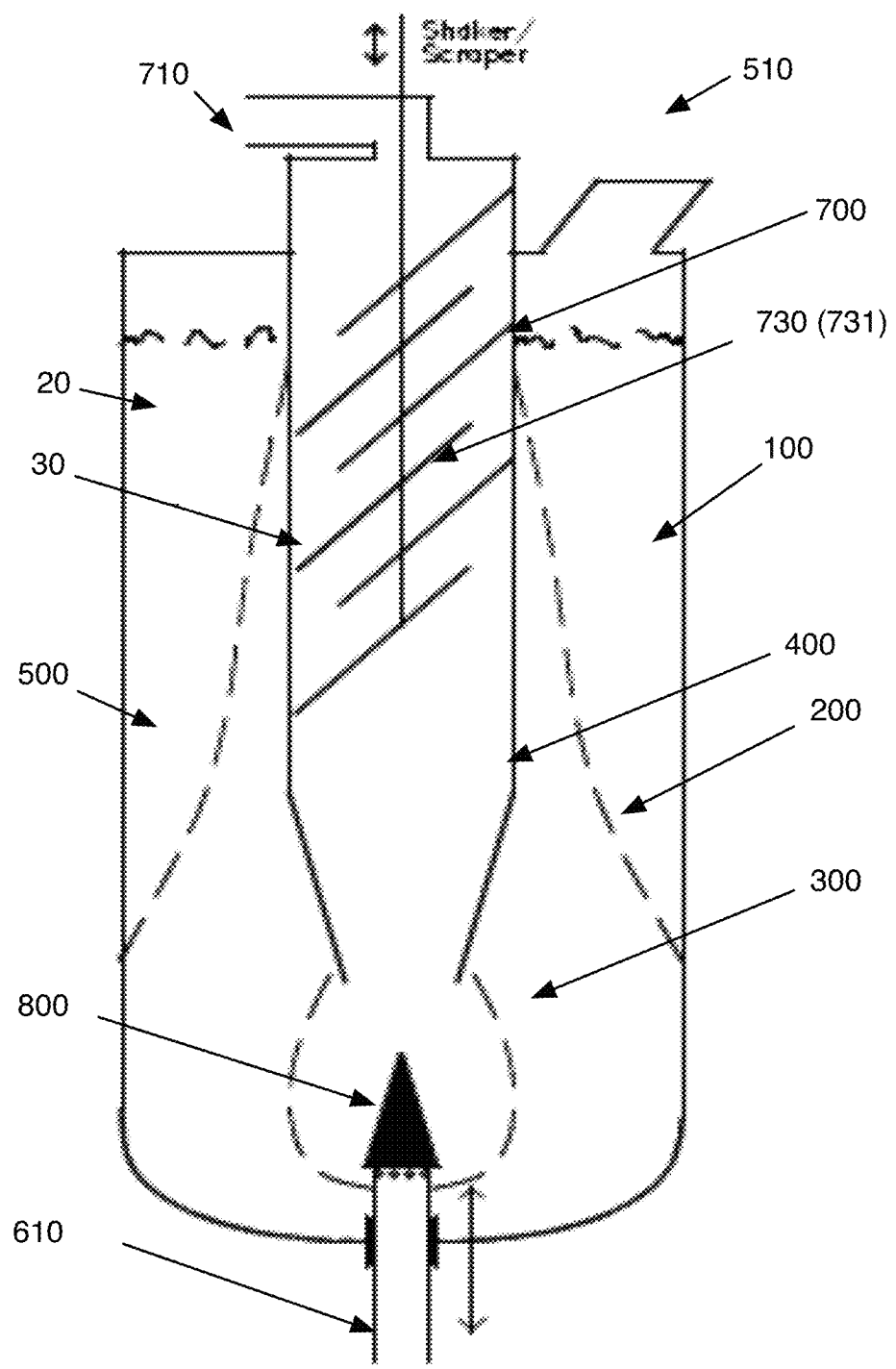
FIG. 6 is a fourth variation of the hybrid gasifier.

The separated combustion zone 300 is preferably fluidly connected to the pyrolysis zone 200 but substantially isolated from the solids (e.g., char) of the pyrolysis zone 200. Combustion zone 300 separation from the pyrolysis zone 200 can be preferable, as separation can reduce the cooling effects of char reduction post combustion, thereby increasing temperature and residence time for improved tar gas cracking. Furthermore, combustion zone 300 separation from the pyrolysis zone 200 allows preferential combustion of the tar gas, reducing the amount of char lost to combustion in conventional systems. The separated combustion zone 300 preferably creates a swirl combustor with swirled airflow, but can alternatively be a fluidized combustor with substantially linear airflow. The separated combustion zone 300 is preferably defined by a combustion body that functions to separate the combustion zone 300 from the solids of the pyrolysis zone 200 and reduction zone 400. The combustion body can additionally function to reduce the amount of heat transferred to the pyrolysis zone 200, thereby maintaining the biomass within the pyrolysis zone 200 at a temperature suitable for controlled pyrolysis. The combustion body is preferably located within a portion of the pyrolysis zone 200, such that the pyrolysis products surround the combustion body. The combustion body preferably encircles an end of the reduction zone 400, and is more preferably coupled to an end of the reduction zone 400, but can alternatively be separate from the reduction zone 400. As shown in FIG. 6, the combustion body is preferably the guide 650 of the swirl combustor, but can alternatively be a separate component. The combustion body can be a right cylinder, a zone of a sphere, a truncated cone (e.g., wherein the cone can be right, oblique, circular, elliptical, etc.) having any suitable aperture, a conical frustum (e.g., wherein the cone can be right, oblique, circular, elliptical, etc.) having any suitable aperture, or have any other suitable form factor. When the combustion body is conical, the base of the combustion body is preferably connected to the reduction zone 400, but the truncated plane of the combustion body can alternatively be connected to the reduction zone 400. The combustion body is preferably substantially fluid impermeable, wherein tar gasses preferably flow through an open end of the combustion body. The combustion body can alternatively be porous, wherein the pores can be sized to permit gaseous flow and prevent solid flow into the lumen. The combustion body can alternatively be louvered or have vacuum-inducing angled draw tubes that direct tar gas into the combustion body. The combustion body preferably abuts against a closed end of a cylinder defining the fixed bed, wherein the junction between the shield and the cylinder can be fluidly permeable but substantially impermeable to char particles of a predetermined size. However, the combustion zone 300 can include any other suitable mechanism that selectively permits tar gas flow into the combustion zone 300 and substantially limits solid flow into the combustion zone 300.

The reduction zone 400 of the gasifier functions to gasify the combusted tar gasses with char. The reduction zone 400 preferably receives combusted tar gasses and char from the combustion zone 300 at a reduction inlet and egresses syngas from a reduction outlet. The reduction zone 400 is preferably a kinetic bed, wherein flow created by gas combustion within the combustion zone 300 and/or the flow of the oxidizing gas (e.g., air flow or oxygen flow) preferably fluidizes the contents of the reduction zone 400. Alternatively, the reduction zone 400 can be a cyclonic bed, vortex bed, spouted bed, or any other suitable kinetic bed. In the aforementioned variations, gas flow through the combustion zone 300 and reduction zone 400 are preferably driven by the same mechanism (e.g., a blower or fan), but can alternatively be driven by the gas flow pathway through the reactor, or by any other suitable flow mechanism. The reduction zone 400 is preferably arranged with a longitudinal axis parallel to a gravity vector, but can alternatively be arranged with a longitudinal axis perpendicular the gravity vector, at an angle to the gravity vector, or arranged in any suitable position. Alternatively, the reduction zone 400 can be oriented at an angle or perpendicular to a gravity vector, particularly when the reduction zone 400 has a swirled flow (e.g., in a cyclonic bed), as the kinetic motion does not rely on gravity for particulate return against the driving flow. Material flow through the reduction zone 400 is preferably parallel to and opposes the gravity vector, with the reduction inlet arranged vertically below the reduction outlet (e.g., along the gravity vector), but can alternatively move material perpendicular to the gravity vector, move material at an angle to the gravity vector, or move material in any suitable direction. The reduction zone 400 is preferably coaxially arranged above the combustion zone 300, but can be otherwise arranged. The reduction zone 400 is preferably thermally coupled to and fluidly isolated from the drying zone 100 and/or a portion of the pyrolysis zone 200, wherein waste heat from the reduction zone 400 preferably heats the material within the drying zone 100 and/or pyrolysis zone 200. The reduction zone 400 is preferably defined by a channel extending through the body of a fixed bed, wherein the fixed bed defines the drying zone 100 and the pyrolysis zone 200. The channel end defining the reduction inlet preferably tapers toward the longitudinal axis of the channel, wherein the taper angle is preferably selected based on the desired material flow rates and/or biomass properties (e.g., particle size, etc.). The tapered channel end can additionally function to ensure that tar gas must pass through the effective cracking heat of the combustion zone 300 before passing into the reduction zone 400. The channel can additionally be continuous with the combustion body and/or guide 650 of the combustion zone 300. Alternatively, the reduction zone 400 can be defined within an annulus surrounding a fixed bed, wherein the fixed bed preferably defines the drying zone 100 and pyrolysis zone 200. The reduction zone 400 can additionally include a particulate separation mechanism 730 that prevents or minimizes char particle egress from the reduction outlet. When the reduction zone 400 is a fluidized bed, the particulate separation mechanism 730 can include a set of baffle plates 731 that create a tortuous (e.g., serpentine or boustrophedonic) path through the reduction zone 400. Char particles entrained within the gas preferably collect on these baffle plates 731 and flow back toward the reduction inlet through gaps at the ends of the baffle plates 731. Alternatively, when the reduction zone 400 includes swirled flow (e.g., in a cyclonic bed), the particulate filter mechanism is preferably a rotational airflow mechanism 733 that creates a cyclone within the reduction zone 400, wherein the cyclone prevents char particle egress from the reduction zone 400 by causing the char particles to aggregate and spin along the wall defining the reduction zone 400 through centrifugal force. The rotational airflow mechanism 733 is preferably located adjacent the reduction outlet, but can alternatively be located in any other suitable position. When used with a swirl combustor, the rotational airflow mechanism 733 preferably creates an airflow having the same rotational direction as the swirl combustor. The rotational airflow mechanism 733 preferably includes a fan, more preferably a centrifugal fan, that blows the fluid within the reduction zone 400 at right angles to the rotational axis, wherein the rotational axis is preferably parallel with the longitudinal axis of the reduction zone 400. However, the rotational airflow mechanism 733 can be any other suitable mechanism that creates a rotational airflow. The rotational airflow mechanism 733 can additionally include augers or material transporters, such as rotary vanes, that extend radially about the reduction zone 400 inside perimeter and function to move char collected on the wall proximal the rotational airflow mechanism 733 away from the rotational airflow mechanism 733 and back down the reduction riser. The movement of char back toward the reduction inlet functions to circuitously recycle the char, which can increase the conversion rate of combusted tar gas into syngas through improved gas-solid interactions. Alternatively, the particulate filter mechanism can be a fluid-permeable mesh or membrane over the reduction outlet, be a selective valve, or be any other suitable particulate filter mechanism. The reduction zone 400 can additionally be fluidly connected to a kinetic riser 700 that functions to facilitate gas flow out of the gasifier. The kinetic riser 700 can additionally function to collect char and to recycle char toward the reduction inlet. The kinetic riser 700 preferably fluidly connects the reduction zone 400 with the gas outlet 710.

2. Gasifier Construction

To achieve the gasifier configurations as described above, the gasifier preferably includes a casing 500, a channel 700 extending longitudinally through a portion of the casing 500, and an air manifold 600 coupled to a burner 800. This gasifier defines a lumen within the channel and an annular space between the channel and casing 500. In one variation of the gasifier, the lumen functions as a portion of kinetic bed and defines the reduction zone 400. The annular space functions as the fixed bed, and preferably sequentially defines the drying zone 100 and the pyrolysis zone 200 along a gravitational vector. In another variation, the lumen defines the fixed bed (the drying zone 100 and pyrolysis zone 200) and the annular space defines the kinetic bed (the reaction and combustion zones). However, the hybrid gasifier 10 can be otherwise configured.

The casing 500 functions to contain the biomass and can additionally function to retain heat. The casing 500 functions to define a substantially fluidly continuous drying zone 100 and pyrolysis zone 200, more preferably fixed bed drying zone 100 and pyrolysis zone 200, and can additionally define the combustion zone 300, more preferably a kinetic bed combustion zone 300. The casing 500 preferably includes a first closed end and a second closed end, wherein the first closed end includes a fuel inlet. The fuel inlet is preferably a controlled opening and includes an airlock or valve, but can alternatively be open to the environment. The fuel inlet can additionally include a dryer transporter that raises biomass up to the fuel inlet. The first closed end is preferably substantially sealed (e.g., welded, interference fit, manufactured as a singular piece, etc.) about an end of the channel extending beyond the first closed end, but can alternatively encapsulate the channel. The second closed end preferably opposes the first closed end. The second closed end is preferably oriented below the first closed end along a gravity vector, such that the longitudinal axis of the casing 500 is substantially parallel to the gravity vector. However, the casing 500 can be oriented horizontally or in any suitable position. The second closed end is preferably curved (e.g., wherein the interior of the second closed end is curved), but can alternatively be flat, angled, or have any other suitable geometry. The second closed end can additionally function to divert air toward an inlet of the channel. The casing 500 is preferably thermally insulated, but can alternatively be thermally conductive.

The channel 700 (kinetic channel, kinetic chamber, riser) functions to fluidly isolate an interior portion of the casing 500 from the remainder of the casing 500. The channel can additionally function to define the reduction zone 400 therein. The channel can additionally function to thermally couple the channel lumen to the casing lumen. More preferably, the channel can function to thermally couple the reduction zone 400 to the pyrolysis zone 200 and drying zone 100. The channel preferably forms the riser, but can alternatively define a portion of the riser or be partially defined by the riser. The channel 700 preferably defines the kinetic beds of the gasifier, and can define a fluidized bed (e.g., with a fluidization channel or riser), a rotary bed (e.g., be a cyclonic, vortex, or centrifugal bed, etc., with a cyclonic, vortex, or centrifugal channel or riser, respectively), or any other suitable kinetic bed, wherein the channels defining different types of kinetic flow (e.g., fluidized, rotational, etc.) can be the same channel or be different channels with different inlet, lumen, or outlet features. The channel preferably extends parallel to the longitudinal axis of the casing 500, and more preferably extends coaxially with the casing 500 but can alternatively extend offset from the casing longitudinal axis. The channel preferably extends along a portion of the casing length, wherein the second end of the channel preferably terminates before the second end of the casing 500 is preferably separated from the second end of the casing 500 by a combustion distance. However, the channel can substantially abut against the second end of the casing 500. The length of the channel and the combustion distance is preferably selected based on the biomass properties (e.g., size, density, composition, water content, etc.), but can be otherwise determined. The channel includes a first end and a second end. The first end of the channel is proximal the first end of the casing 500 and is preferably substantially sealed except for a gas outlet 710. The gas outlet 710 preferably includes a valve (e.g., a passive, one way valve but alternatively any other suitable valve), but can alternatively be an uncontrolled opening. The first end of the channel can extend beyond the first end of the casing 500, can be substantially level with the first end of the casing 500, or can be encapsulated within the casing 500. The second end of the channel is preferably tapered inward, toward the longitudinal axis of the channel. The channel is preferably thermally conductive, and is preferably manufactured from metal. The channel is preferably formed as a separate piece from the casing 500 (e.g., as an insert), but can be otherwise manufactured.

The air manifold 600 functions to provide oxygen to the combustion zone 300 and preferably includes an air inlet 610 fluidly connected to an oxygen source (e.g., the ambient environment, an oxygen tank, or any other suitable oxygen source), an air outlet 630 fluidly connected to the casing 500 interior, more preferably to the combustion zone 300, and an air channel fluidly connecting the air inlet 610 to the air outlet 630. The air manifold 600 can additionally include a valve that functions to maintain a fluid seal within the combustion zone 300, wherein the valve is preferably a passive one-way valve that permits fluid flow from the air inlet 610 to the air outlet 630, but can alternatively be any other suitable valve (e.g., be active, be a two-way valve, etc.). The valve is preferably located at the air inlet 610, but can alternatively be located along the air channel or at the air outlet 630. The air outlet 630 can be an opening, a nozzle that extends into the combustion zone 300, or any other suitable air manifold 600 termination. The air manifold 600 is preferably thermally conductive, such that waste heat from the gasifier stages en route to the combustion can be absorbed, but can alternatively be thermally insulated. In one variation of the gasifier, the air manifold 600 extends along the longitudinal axis of the casing 500. In variation of the gasifier, the air manifold 600 wraps around the casing 500, maximizing the air manifold travel path and heat transfer surface. The air manifold 600 preferably terminates at a point between the second end of the channel and the second end of the casing 500, but can alternatively terminate at a point along the channel length, proximal the second end of the casing 500. The combustion zone 300 is preferably created in the area proximal to and downstream from the air outlet 630. The air manifold 600 preferably extends from the first end of the casing 500 toward the second end of the casing 500. The air manifold 600 preferably extends along the side of the channel proximal the casing 500 (e.g., within the annular space) as shown in FIG. 4, but can alternatively extend longitudinally through the channel interior as shown in FIG. 3. Alternatively, the air manifold 600 can extend from the second end of the casing 500 toward the first end of the casing 500 as shown in FIG. 1, wherein the air manifold 600 preferably terminates prior to the second end of the channel. In another variation, the air manifold 600 extends through the side of the casing 500 and terminates within a space substantially isolated from the solid particulates of the pyrolysis zone 200 by a guide 650 coupled to the air outlet 630. The air manifold 600 preferably introduces air in a direction tangential to a radius extending from the longitudinal axis of the gasifier, such that rotational flow (e.g., swirled flow) can be achieved against the guide walls in the combustion zone to form a swirled combustor. The rotational flow preferably includes a vector at a non-zero angle to a normal vector to the kinetic channel longitudinal axis (e.g., such that the rotational flow is directed toward the second end of the casing or the inlet of the kinetic channel), but can alternatively flow substantially perpendicular to the longitudinal axis. The rotational flow in the combustion zone preferably creates rotational flow within the reduction zone (e.g., cyclonic flow, rotary flow, vortex flow, etc.), but rotational flow can alternatively be limited to the combustion zone. The guide 650 is preferably substantially closed at one end, wherein the combustion zone 300 is defined within the guide 650 and along the portion of the gasifier between the open end of the guide 650 and the second end of the channel. The air manifold 600 preferably terminates proximal the closed end of the guide 650, but can alternatively terminate at any suitable point along the guide length. In one example, the closed end of the guide 650 is proximal the second end of the casing 500 as shown in FIG. 7. In another example as shown in FIG. 8, the closed end of the guide 650 is defined about the second end of the channel, wherein the guide 650 is sealed about the channel and encircles the tapered channel second end. However, the air manifold 600 can have any other suitable configuration. The air manifold 600 can additionally be fluidly connected to a volume defined between the first end of the casing 500 and the biomass at the top of the drying zone 100 by an air recycling manifold, wherein moisture from the dried biomass can be recycled into the air manifold 600.

The burner 800 of the gasifier functions to combust the tar gasses with air. The burner 800 is preferably a flame-generating mechanism, but can alternatively be a resistive heater, a spark-generating mechanism, or any other suitable heat-generating mechanism. When the burner 800 has directionality (e.g., when the burner 800 is a flame-generating mechanism), the burner 800 heat is preferably directed co-currently with the airflow from the air manifold 600 (e.g., in the same direction as the airflow from the air outlet 630), but can alternatively be directed perpendicular to the airflow, at an angle to the airflow, against the airflow, or in any suitable direction. The burner 800 is preferably arranged adjacent the air outlet 630, but can alternatively be arranged downstream from the air outlet 630 along the airflow path, or arranged in any other suitable position.

The gasifier can additionally include a size reduction mechanism 900 that functions to reduce a dimension of the biomass particle below a threshold size, as appropriate for the kinetic sections of the gasifier. The size reduction mechanism 900 is preferably a comminution mechanism, more preferably a grinder, but can alternatively be a crushing mechanism, pulverization mechanism, fracturing mechanism, or any other suitable size reduction mechanism 900. The grinder preferably homogenizes the biomass particles to a substantially uniform size (e.g., by reducing the biomass to below a threshold size, by filtering for a threshold size, etc.), but can alternatively generate biomass particles within a predetermined range of sizes. The grinder is preferably a char grinder, wherein the char grinder is arranged between the combustion and/or reduction zone 400, and the pyrolysis zone 200. More preferably, the char grinder is arranged about the channel, such that the char grinder encircles the channel. The char grinder includes an abrading body and an abrading cage, wherein charred biomass is preferably captured by the abrading cage and is ground against the abrading body. The ground char preferably passes through the char grinder into the combustion and/or reduction zone 400, but can alternatively travel along the abrading surface of the abrading body and collect at an end of the char grinder, wherein said end of the char grinder is preferably fluidly connected to the combustion zone 300, more preferably the reduction zone 400. The char grinder is preferably located in the material flow path between the pyrolysis zone 200 and the combustion zone 300. More preferably, the char grinder is located between the pyrolysis zone 200 and the reduction zone 400. The char grinder preferably forms substantially the entire interface between the pyrolysis zone 200 and the combustion and/or reduction zone 400, but can alternatively extend along a portion of the interface. However, the char grinder can be located in the body of the pyrolysis zone 200 (e.g., at an intermediate distance between the drying zone 100 and the combustion zone 300) or at any other suitable location within the gasifier. The char grinder is preferably arranged with the abrading cage proximal the pyrolysis zone 200 and the abrading body proximal the reduction zone 400 (e.g., proximal the combustion or reduction zone 400 or distal the pyrolysis zone 200). The abrading cage preferably translates (e.g., reciprocates, rotates, etc.) relative to the abrading body, wherein a motor or other translation device preferably controls abrading cage translation. The abrading body is preferably statically coupled to the remainder of the gasifier (e.g., welded, screwed, or otherwise mounted to the gasifier body), but can alternatively translate relative to the gasifier body, wherein the abrading cage is preferably statically coupled to the gasifier. The abrading cage preferably translates relative to the abrading body at a relatively slow speed (e.g., 1-10 RPM), but can alternatively translate against the abrading body at any suitable speed. The char grinder is preferably thermally conductive, and preferably heats the captured biomass with heat from the combustion zone 300 and/or reduction zone 400, but can alternatively be thermally insulative, wherein the char grinder can function to insulate the pyrolysis zone 200 or substantially reduce the heat transfer from the combustion and/or reduction zone 400 to the pyrolysis zone 200.

The abrading body of the char grinder functions to provide a surface that the char can be ground against. The abrading body is preferably substantially solid and continuous, but can alternatively include apertures (e.g., through-holes), wherein the through holes are preferably substantially equivalent to the desired char particle size for the kinetic gasifier sections (e.g., the apertures have a dimension substantially equivalent to the threshold size). The desired char particle size is preferably selected based on the anticipated suspension ability and reaction character in the kinetic reduction zone 400. The abrading body preferably includes an abrading surface arranged adjacent the abrading cage. The abrading surface is preferably substantially smooth, but can alternatively be textured to facilitate grinding. The abrading surface texture preferably includes raised segments extending out of the abrading surface toward the abrading cage, but can alternatively include recessed segments. The abrading surface texture can include cross-hatching, raised circular portions, sandpaper, angled teeth, or any other suitable texture. The abrading surface texture is preferably manufactured as a singular piece with the abrading body, but can alternatively be coupled to the abrading surface after abrading body manufacture (e.g., by adhesion, welding, etc.). The abrading body can be cylindrical, conical, flat (e.g., prismatic), wavy, or have any other suitable shape. When the abrading body is curved, the abrading surface is preferably the convex side of the abrading body, but can alternatively be the concave side of the abrading body.

The abrading cage of the char grinder functions to capture biomass and to move the biomass against the abrading body, more preferably to grind the char from the biomass against the abrading body. The abrading cage preferably includes a singular piece with a plurality of through-holes (e.g., apertures), wherein the through-holes are preferably dimensioned to capture charred biomass. The apertures of the abrading cage are preferably larger than the apertures of the abrading body, but can alternatively be the same or smaller. The through-holes of the abrading cage can have a size or dimension selected based on the maximum char size that the kinetic bed is configured to receive, the biomass size/dimension at which sufficient charring has been achieved, the char particle size (e.g., selected based on the anticipated suspension ability and reaction character in the kinetic reduction zone 400), or can be based on any other suitable charred biomass parameter. The through-holes can have a circular, polygonal (e.g., regular convex polygon, concave polygon, rectangular, rhomboid, etc.), or any other suitable perimeter. The abrading cage preferably includes a second abrading surface arranged adjacent the abrading body. The second abrading surface is preferably substantially smooth, but can alternatively be textured to facilitate grinding. The second abrading surface texture preferably includes raised segments extending out of the abrading surface toward the abrading body, but can alternatively include recessed segments. The second abrading surface texture can include cross-hatching, raised circular portions, sandpaper, angled teeth, or any other suitable texture. The second abrading surface texture preferably complements the abrading surface texture of the abrading body, but can alternatively oppose the abrading surface of the abrading body. The second abrading surface texture is preferably manufactured as a singular piece with the abrading cage, but can alternatively be coupled to the abrading surface after abrading cage manufacture (e.g., by adhesion, welding, etc.). The abrading cage preferably complements the profile of the abrading body. More preferably, the abrading cage traces the profile of the abrading surface. However, the abrading cage can be otherwise configured. The abrading cage can be cylindrical, conical, flat (e.g., prismatic), wavy, or have any other suitable shape. When the abrading cage is curved, the second abrading surface is preferably the concave side of the abrading cage (especially when the abrading surface is on the convex side of the abrading body), but can alternatively be the concave side of the abrading cage. The abrading cage can translate along the longitudinal axis of the abrading body, but can alternatively translate perpendicular to the longitudinal axis of the abrading body, translate in an arcuate direction about the abrading body (e.g., roll about the abrading body), or translate in any suitable manner relative to the abrading body. The abrading cage is preferably separated from the abrading body by a distance, wherein the distance can be similar to or larger than the desired char particle size, smaller than the desired char particle size, or any other suitable distance. The distance is preferably fixed, but can alternatively be adjustable, either manually or automatically based on the gasifier output or any other parameter.

The hybrid gasifier 10 can additionally include a char removal mechanism that functions to remove char from the gasifier for external use (for instance, as biochar). More preferably, the char removal mechanism is configured to remove char from the pyrolysis zone 200 before it passes through the combustion zone 300 and/or reduction zone 400 and is otherwise consumed. The char removal mechanism can be proximal the combustion zone 300 but alternatively distal from the combustion zone 300. The char removal mechanism can include a char transportation mechanism that extends into the pyrolysis zone 200, such as an auger, belt, bucket, or any other suitable char transportation mechanism. The char removal mechanism can additionally include an active driving mechanism (e.g., motor) that drives the char transportation mechanism, but can alternatively include a manual driving mechanism (e.g., a crankshaft) or be passively driven (e.g., with gravity, wherein the weight of collected char moves the char transportation mechanism. The char removal mechanism preferably additionally includes a char reservoir that receives and retains char from the char transportation mechanism. The char reservoir is preferably fluidly sealed from the ambient environment (e.g., from an oxygen source), but can alternatively be open to the environment, wherein the interface between the char reservoir and the char transportation mechanism preferably additionally includes an auger and the char transportation mechanism preferably includes a cooling mechanism (e.g., heat fins) that cool the transported char. However, any other suitable char removal mechanism can be used.

The gasifier can additionally a particulate separation mechanism 730 that functions to remove char particulates from the gas prior to gas egress from the gasifier. The particulate separation mechanism 730 is preferably arranged within the channel, more preferably within the channel distal the second closed end, but can alternatively be arranged in any suitable position. In one variation of the particulate separation mechanism 730 can include angled baffle plates 731 extending from the interior surface of the channel walls, wherein the baffle plates 731 create a tortuous flow path through the reduction zone 400 such that char particulates are collected on the baffle plates 731. The baffle plates 731 are preferably angled such that the collected char falls toward the second closed end after collection, but can be otherwise oriented. The baffle plates 731 can additionally include a shaker or scraper that facilitates char removal from the plate surfaces. In another variation of the gasifier, the particulate separation mechanism 730 can include a rotary blower or fan, wherein the swirled airflow of the rotary blower generates a centrifugal force on the char particulates and projects the char particulates outward and onto the interior wall of the channel. In a specific variation of the gasifier, the rotary blower generates a first rotational flow (e.g., cyclonic, rotary, vortex) within the riser (channel 700) and the air guide and air manifold cooperative generates a second rotational flow (e.g., cyclonic, rotary, vortex) within the riser. Alternatively, the rotational flow within the riser can be solely due to the rotary blower or the rotational flow of the combustion zone. The first and second rotational flow are preferably coaxial, but can alternatively be offset and parallel or aligned at a non-zero angle. The first and second rotational flow preferably rotate in the same direction (e.g., such that a cyclonic or vortex flow extending from the bottom to the top of the riser is formed), but can alternatively rotate in opposing directions. The rotary blower is preferably arranged proximal the first closed end of the casing 500 and controls gas flow within the channel, but can alternatively be arranged elsewhere within the channel. In another variation of the gasifier, the particulate separation mechanism 730 can include char recirculation vanes 735 extending along the length of the channel interior. The char recirculation vanes 735 preferably spiral along the channel interior, but can alternatively have any other suitable configuration that directs swirling char back down towards the reduction channel inlet. The char recirculation vanes 735 are preferably static, but can alternatively be dynamic and rotate about the longitudinal axis of the channel. The char recirculation vanes 735 are preferably utilized with a variation of gasifier with a particulate separation mechanism 730 that aggregates char along the channel walls, but can be used in any other suitable variation of the gasifier. However, the gasifier can include any other suitable particulate separation mechanism 730.

The gasifier can additionally include an indirect gasification mechanism that functions to remove combusted tar gas from the gasifier prior to reduction, and to use the heat from the combusted tar gas to heat a second fluid stream (e.g., steam) that is used to reduce the char into fuel (indirect gasification). Indirect gasification can be desirable as air combusted tar gas contains a large amount of nitrogen, which dilutes the energy density of the output gas. By reducing the char with a second fluid stream having little or no nitrogen, the gasifier can produce a gaseous fuel stream that is more energy dense. As reduction requires extremely high temperatures, using the heat from the combusted tar gas to heat the second fluid stream can enable reduction within the temperature regimes of the gasifier. In one variation, the gasifier can include a combustion container that fluidly separates the combustion zone 300 from the reduction zone 400. In one example, the combustion container is arranged within the end of the channel proximal the second closed end of the casing 500. The combustion container can be static or mobile. The combustion container is preferably arranged within the channel such that a char inlet is created between the channel and the combustion container (e.g., the channel interior is fluidly connected to the pyrolysis zone 200). The combustion container preferably has an outlet fluidly connected to a flue gas manifold. The flue gas manifold is preferably thermally connected to a second fluid manifold. The second fluid manifold is preferably fluidly connected to the channel interior (e.g., the reduction zone 400). The second fluid manifold can only transfer the second fluid or can transfer the second fluid and an oxygen-laden fluid source (e.g., ambient air). The second fluid manifold and flue gas manifold are preferably arranged such that cross-flow is induced between the respectively contained fluids, but can be alternatively arranged. In operation, tar gas is extracted from the gasifier (e.g., from a point above the pyrolysis zone 200, relative to a gravity vector) and fed into the combustion container. The tar gas is combusted within the combustion container and the resultant gas flows into the flue gas manifold, wherein the flue gas exchanges heat with the incoming second fluid (e.g., steam). The second fluid flows into the reduction zone 400 (e.g., channel interior) and is reduced into gaseous fuel, which preferably subsequently flows out of the gasifier through a fuel outlet.

3. Examples of the Hybrid Gasifier

In a first example of the hybrid gasifier 10 as shown in FIG. 1, the hybrid gasifier 10 includes a casing 500, a channel arranged coaxially within the casing 500 and extending along a portion of the casing length from the first end of the casing 500, and an air manifold 600 coaxially arranged with the casing 500 and channel, wherein the air manifold 600 extends from the second end of the casing 500 and terminates proximal the second end of the channel. As shown in FIG. 5, the gasifier can additionally include a char grinder encircling the channel. The burner 800 is preferably located proximal the air outlet 630, and is directed toward the second end of the channel. The annular space formed between the casing 500 and the channel preferably sequentially defines a drying zone 100 proximal the fuel inlet (e.g., the first end of the casing 500) and a pyrolysis zone 200 proximal the second end of the casing 500. The channel preferably defines the reduction zone 400, and the area between the second end of the channel and the air outlet 630 preferably defines the combustion zone 300, wherein the combustion zone 300 is a fluidized combustor continuous with the pyrolysis zone 200.

In a second example of the hybrid gasifier 10 as shown in FIG. 3, the hybrid gasifier 10 includes a casing 500, a channel arranged coaxially within the casing 500 and extending along a portion of the casing length from the first end of the casing 500, and an air manifold 600 coaxially arranged with the casing 500 and channel, the air manifold 600 extending from the first end of the casing 500, coaxially through the channel, and terminating beyond the second end of the channel. The gasifier can additionally include a char grinder encircling the channel. The burner 800 is preferably located proximal the air outlet 630, and is directed toward the second end of the casing 500. The burner 800 is preferably arranged on the exterior of the air manifold 600, but can alternatively be arranged on the interior. The annular space formed between the casing 500 and the channel preferably sequentially defines a drying zone 100 proximal the fuel inlet (e.g., the first end of the casing 500) and a pyrolysis zone 200 proximal the second end of the casing 500. The channel preferably defines the reduction zone 400, and the area between the second end of the channel and the second end of the casing 500 preferably defines the combustion zone 300, wherein the combustion zone 300 is a fluidized combustor continuous with the pyrolysis zone 200.

In a third example of the hybrid gasifier 10 as shown in FIG. 4, the hybrid gasifier 10 includes a casing 500, a channel arranged coaxially within the casing 500 and extending along a portion of the casing length from the first end of the casing 500, and an air manifold 600 extending along the channel between the channel and casing 500. The air manifold 600 preferably terminates at the point wherein the second end of the channel begins to taper, but can alternatively extend to the second end of the channel. The air manifold 600 preferably forms an annular channel about the channel, but can alternatively extend along a portion of the channel perimeter. The burner 800 is preferably located proximal the air outlet 630, and is directed toward the second end of the casing 500. The burner 800 is preferably arranged between the air manifold 600 and the casing side. The annular space formed between the casing 500 and the channel preferably sequentially defines a drying zone 100 proximal the fuel inlet (e.g., the first end of the casing 500) and a pyrolysis zone 200 proximal the second end of the casing 500. The channel preferably defines the reduction zone 400, and the area between the second end of the channel and the second end of the casing 500 preferably defines the combustion zone 300, wherein the combustion zone 300 is a fluidized combustor continuous with the pyrolysis zone 200.

In a fourth example of the hybrid gasifier 10 as shown in FIG. 6, the hybrid gasifier 10 includes a casing 500, a channel arranged coaxially within the casing 500 and extending along a portion of the casing length from the first end of the casing 500, an air manifold 600 coaxially arranged with the casing 500 and channel, wherein the air manifold 600 extends from the second end of the casing 500 and terminates proximal the second end of the channel, and a series of baffle plates 731 extending from the channel walls into the channel interior. The gasifier can additionally include a char grinder encircling the channel. The burner 800 is preferably located proximal the air outlet 630, and is directed toward the second end of the channel. The annular space formed between the casing 500 and the channel preferably sequentially defines a drying zone 100 proximal the fuel inlet (e.g., the first end of the casing 500) and a pyrolysis zone 200 proximal the second end of the casing 500. The channel preferably defines the reduction zone 400, and the area between the second end of the channel and the air outlet 630 preferably defines the combustion zone 300, wherein the combustion zone 300 is a fluidized combustor continuous with the pyrolysis zone 200. The baffle plates 731 preferably define a tortuous path through the reduction zone 400, wherein the baffle plates 731 preferably remove char particulates from the gas flowing through the reduction zone 400. The baffle plates 731 are preferably additionally connected to a shaker or scraper that functions to agitate the baffle plates 731 to remove the collected particulates, wherein the shaker/scraper preferably extends through the first closed end of the casing 500.

In a fifth example of the hybrid gasifier 10 as shown in FIG. 7, the hybrid gasifier 10 includes a casing 500, a channel arranged coaxially within the casing 500 and extending along a portion of the casing length from the first end of the casing 500, and an air manifold 600 extending through the side of the casing 500, proximal the second end of the casing 500, that terminates in a guide 650. The gasifier can additionally include a char grinder encircling the channel. The guide 650 is preferably arranged with the closed end proximal the second end of the casing 500 and the open end proximal the second end of the channel. The air manifold 600 preferably introduces air at a point proximal the closed end of the guide 650, but can alternatively be angled such that air is directed toward the closed end of the guide 650. The air manifold 600 preferably directs air in a direction tangential to a radius extending from the longitudinal axis of the gasifier against the guide walls to form a swirl flow. The burner 800 is preferably located proximal the air outlet 630, and is preferably the guide 650 but can alternatively be any other suitable burner 800 configured to combust the contents of the guide 650. The annular space formed between the casing 500 and the channel preferably sequentially defines a drying zone 100 proximal the fuel inlet (e.g., the first end of the casing 500) and a pyrolysis zone 200 proximal the second end of the fuel inlet. The channel preferably defines the reduction zone 400, and the area between the second end of the channel and the closed end of the guide 650 preferably defines the combustion zone 300, wherein the combustion zone 300 is a swirl combustor continuous with the pyrolysis zone 200.

In a sixth example of the hybrid gasifier 10 as shown in FIG. 8, the hybrid gasifier 10 includes a casing 500, a channel arranged coaxially within the casing 500 and extending along a portion of the casing length from the first end of the casing 500, and an air manifold 600 extending through the side of the casing 500, between the first and second ends of the casing 500, that terminates in a guide 650. The gasifier can additionally include a char grinder encircling the channel. The closed end of the guide 650 is preferably cooperatively defined with the channel walls, wherein the closed end guide 650 is preferably sealed against the channel wall between the first and second end of the channel, more preferably where the second end of the channel begins to taper. The open end of the guide 650 is preferably proximal the second end of the casing 500, more preferably abuts against the closed end of the casing 500 but alternatively is separated from the casing 500 by a given distance. The open end of the guide 650 preferably extends past the second end of the channel, but can alternatively terminate at substantially the same plane as the second end of the channel. The air manifold 600 preferably introduces air at a point proximal the closed end of the guide 650, but can alternatively be angled such that air is directed toward the open end of the guide 650. The air manifold 600 preferably directs air in a direction tangential to a radius extending from the longitudinal axis of the gasifier against the guide walls to form a swirl flow. The swirl flow extends downward into the bed, reverses direction, and travels back upward through the channel aperture and into the kinetic riser 700. The burner 800 is preferably located proximal the air outlet 630, and is preferably the guide 650 but can alternatively be any other suitable burner 800 configured to combust the contents of the guide 650. The annular space formed between the casing 500 and the channel preferably sequentially defines a drying zone 100 proximal the fuel inlet (e.g., the first end of the casing 500) and a pyrolysis zone 200 proximal the second end of the fuel inlet. The channel preferably defines the reduction zone 400, and the area between the second end of the channel and the guide walls preferably defines the combustion zone 300, wherein the combustion zone 300 is a swirl combustor separated from the pyrolysis zone 200.

Figure 9:
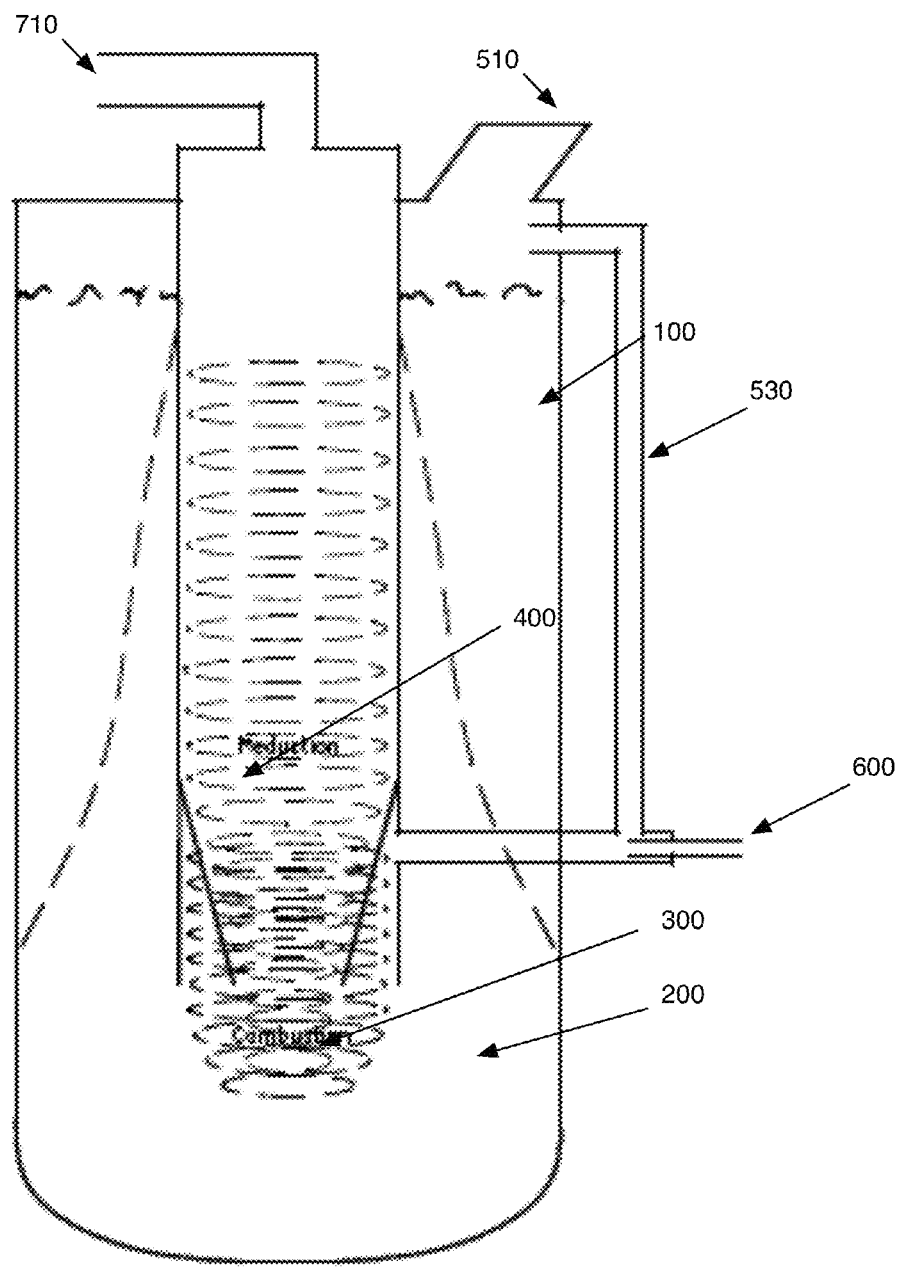
FIG. 9 is a seventh variation of the hybrid gasifier.
Figure 10:
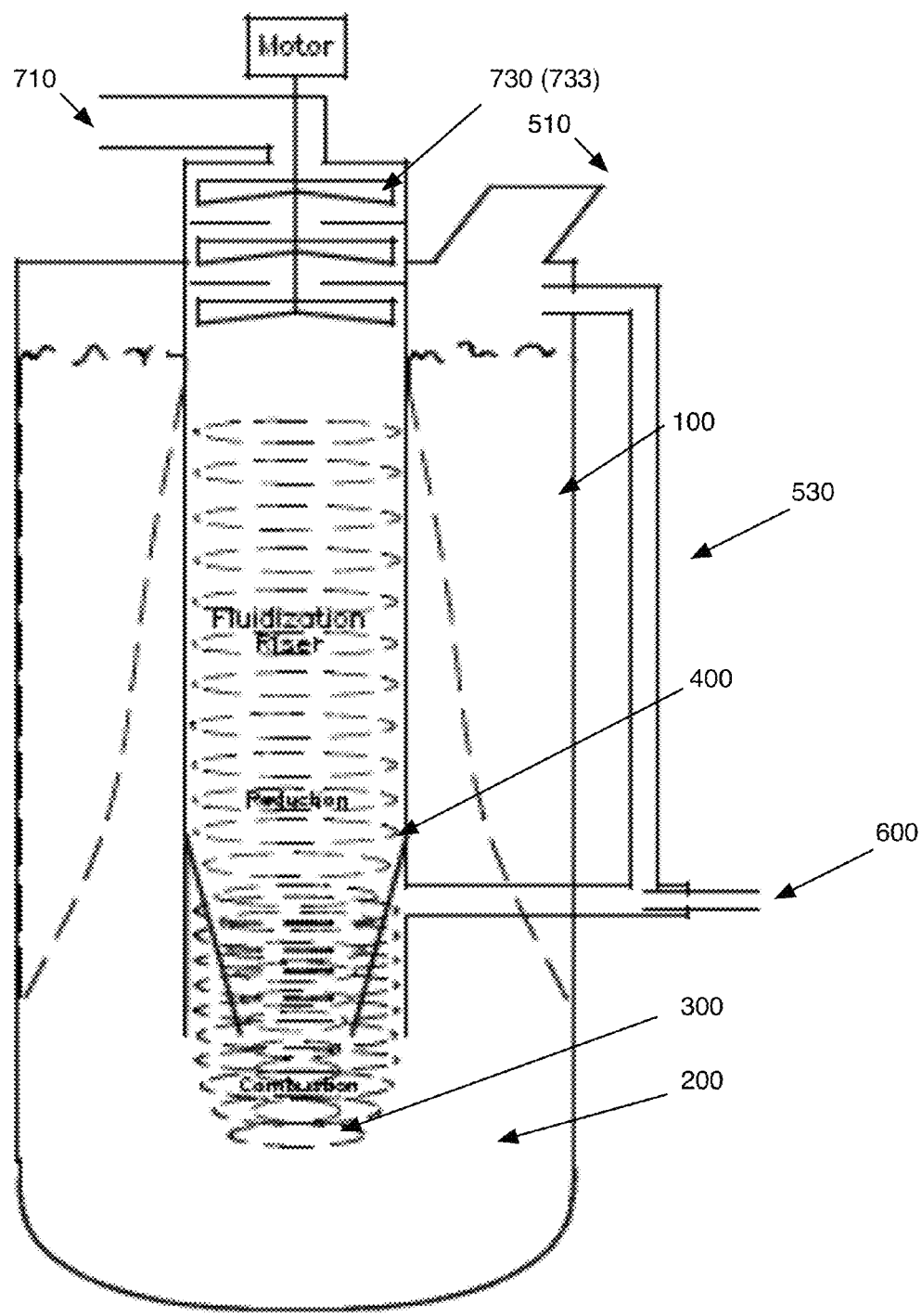
FIG. 10 is an eighth variation of the hybrid gasifier.

In a seventh example of the hybrid gasifier 10 as shown in FIG. 9, the hybrid gasifier 10 is a hybrid fixed-cyclonic gasifier including a casing 500, a channel arranged coaxially within the casing 500 and extending along a portion of the casing length from the first end of the casing 500, and an air manifold 600 extending through the side of the casing 500, between the first and second ends of the casing 500, that terminates in a guide 650. The gasifier can additionally include a char grinder encircling the channel. The closed end of the guide 650 is preferably cooperatively defined with the channel walls, wherein the closed end guide 650 is preferably sealed against the channel wall between the first and second end of the channel, more preferably where the second end of the channel begins to taper. The open end of the guide 650 is preferably proximal the second end of the casing 500, more preferably abuts against the closed end of the casing 500 but alternatively is separated from the casing 500 by a given distance. The open end of the guide 650 preferably extends past the second end of the channel, but can alternatively terminate at substantially the same plane as the second end of the channel. The air manifold 600 preferably introduces air at a point proximal the closed end of the guide 650, but can alternatively be angled such that air is directed toward the open end of the guide 650. The air manifold 600 preferably directs air in a direction tangential to a radius extending from the longitudinal axis of the gasifier against the guide walls to form a swirl flow. The burner 800 is preferably located proximal the air outlet 630, and is preferably the guide 650 but can alternatively be any other suitable burner 800 configured to combust the contents of the guide 650. The annular space formed between the casing 500 and the channel preferably sequentially defines a drying zone 100 proximal the fuel inlet (e.g., the first end of the casing 500) and a pyrolysis zone 200 proximal the second end of the fuel inlet. The channel preferably defines the reduction zone 400, and the area between the second end of the channel and the guide walls preferably defines the combustion zone 300, wherein the combustion zone 300 is a swirl combustor separated from the pyrolysis zone 200. Air is preferably introduced into the combustion zone 300 at a rate that generates swirled flow within the pyrolysis zone 200, wherein the airflow is preferably turned into the channel interior by the second closed end of the casing 500. The swirled flow within the channel preferably collects char particulates along the channel walls, wherein the char particulates preferably fall along a gravity vector toward the second closed end of the casing 500. Alternatively, as shown in FIG. 10, the swirled flow within the channel can be induced by a rotary blower or fan, wherein the rotary blower or fan preferably induces gaseous flow that rotates in the direction of airflow within the combustion zone 300, but can alternatively induce gaseous flow having a counter rotation to the airflow direction within the combustion zone 300.

Figure 11A:
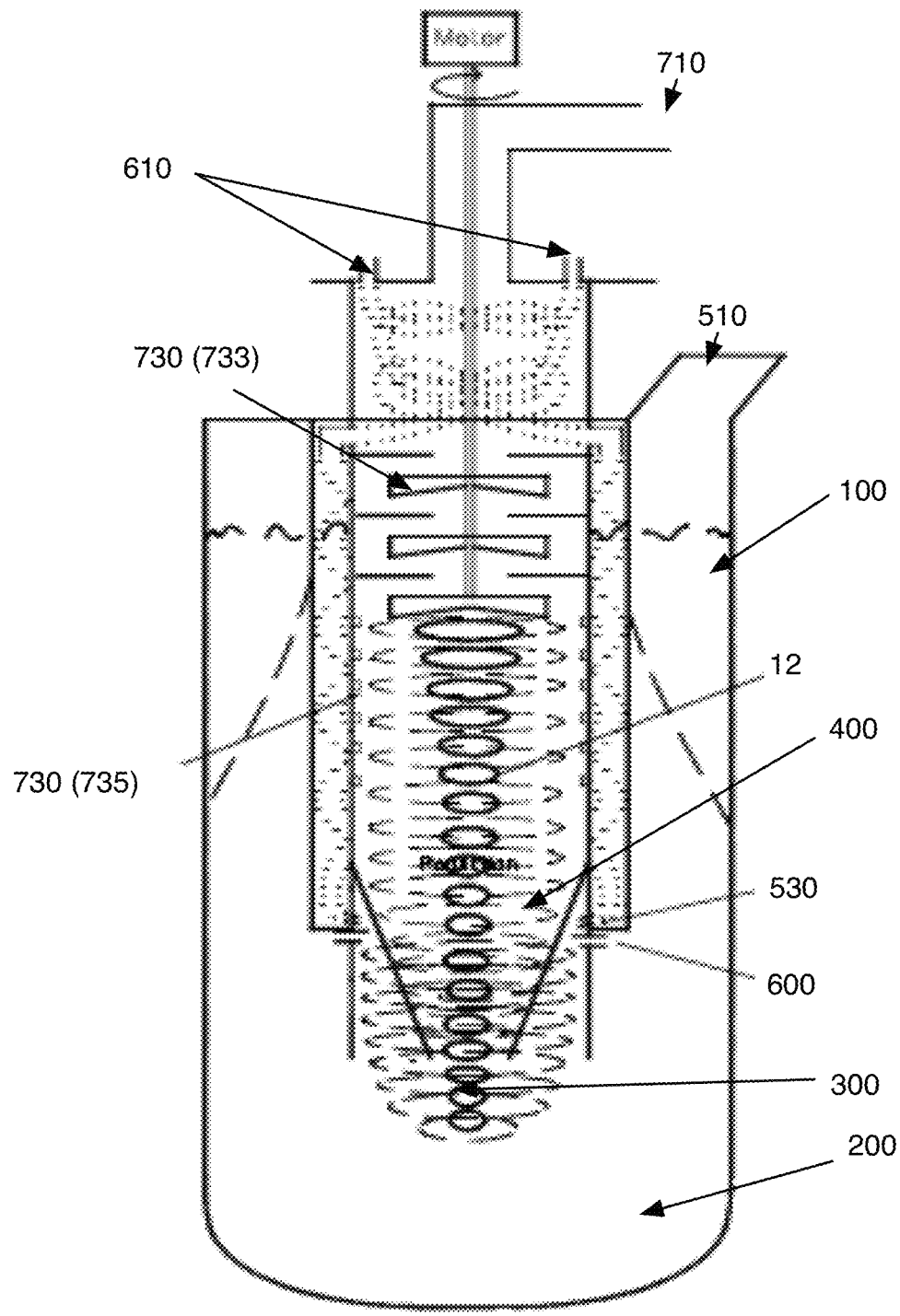
FIGS. 11A and 11B are a ninth variation of the hybrid gasifier without and with a char grinder, respectively.
Figure 11B:
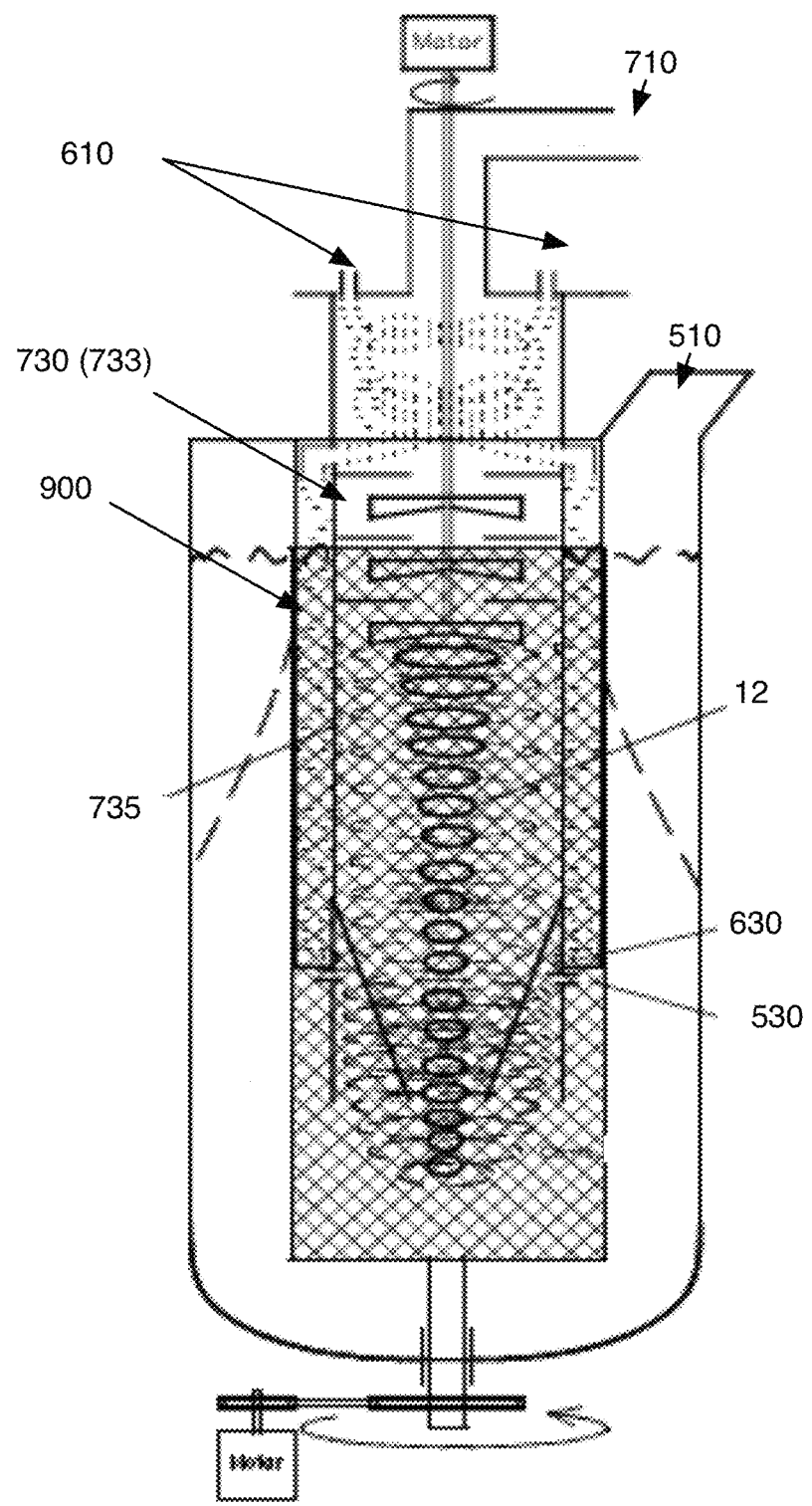

In a eighth example of the hybrid gasifier 10 as shown in FIG. 11A, the hybrid gasifier 10 is a hybrid fixed-spouted vortex gasifier including a casing 500, a channel arranged coaxially within the casing 500 and extending along a portion of the casing length from the first end of the casing 500, an air manifold 600 that terminates in a guide 650 proximal the second end of the casing 500, and a particulate separation mechanism 730 including a rotary blower arranged within the first end of the channel. The particulate separation mechanism 730 can additionally include char recirculation vanes 735 spiraling downward along the channel interior to return char to the channel base. The gasifier can additionally include a char grinder encircling the channel, as shown in FIG. 11B. The gasifier can additionally include a tar gas intake fluidly connecting the interstitial space between the guide 650 and the channel with the space between the channel and the casing 500 (e.g., the pyrolysis zone 200), wherein the tar gas intake is preferably oriented perpendicular to or at an acute angle (as measured from a gravity vector) to the longitudinal axis of the channel, such that tar gas enters the tar gas intake but char does not. The tar gas intake preferably terminates between the air manifold 600 termination into the guide 650 and the second end of the casing 500, but can alternatively terminate in any suitable position. The air manifold 600 preferably extends along a portion of the channel length from the first end of the casing 500, wherein the air manifold 600 preferably spirals about the channel. The closed end of the guide 650 is preferably cooperatively defined with the channel walls, wherein the closed end guide 650 is preferably sealed against the channel wall between the first and second end of the channel, more preferably where the second end of the channel begins to taper. The open end of the guide 650 is preferably proximal the second end of the casing 500, more preferably abuts against the closed end of the casing 500 but alternatively is separated from the casing 500 by a given distance. The open end of the guide 650 preferably extends past the second end of the channel, but can alternatively terminate at substantially the same plane as the second end of the channel. The air manifold 600 preferably introduces air at a point proximal the closed end of the guide 650, but can alternatively be angled such that air is directed toward the open end of the guide 650. The air manifold 600 preferably directs air in a direction tangential to a radius extending from the longitudinal axis of the gasifier against the guide walls to form a swirl flow. The burner 800 is preferably located proximal the air outlet 630, and is preferably the guide 650 but can alternatively be any other suitable burner 800 configured to combust the contents of the guide 650. The annular space formed between the casing 500 and the channel preferably sequentially defines a drying zone 100 proximal the fuel inlet (e.g., the first end of the casing 500) and a pyrolysis zone 200 proximal the second end of the fuel inlet. The channel preferably defines the reduction zone 400, and the area between the second end of the channel and the guide walls preferably defines the combustion zone 300. In operation, the gasifier forms a spouted vortex flow 12, wherein swirling combusted tar gas is turned around proximal the second end of the casing 500, flows into the reduction zone 400 and upward as a tornado, hits the rotary blower at the first end of the channel, is spun and thrown outward to the channel walls, and circulates back downward along the channel walls to the channel base. This recirculating flow is created by the combination of the swirl combustion below the channel base and rotary blower flow at the channel top. Char builds up at the second end of the channel, wherein the flow from the combusted tar gas preferably forms a spout through this collected char. Char is picked up from the pyrolysis zone 200 proximal the guide 650 until the channel is filled to a volume and mass that substantially balances the suction at the second end of the channel.

Figure 12:
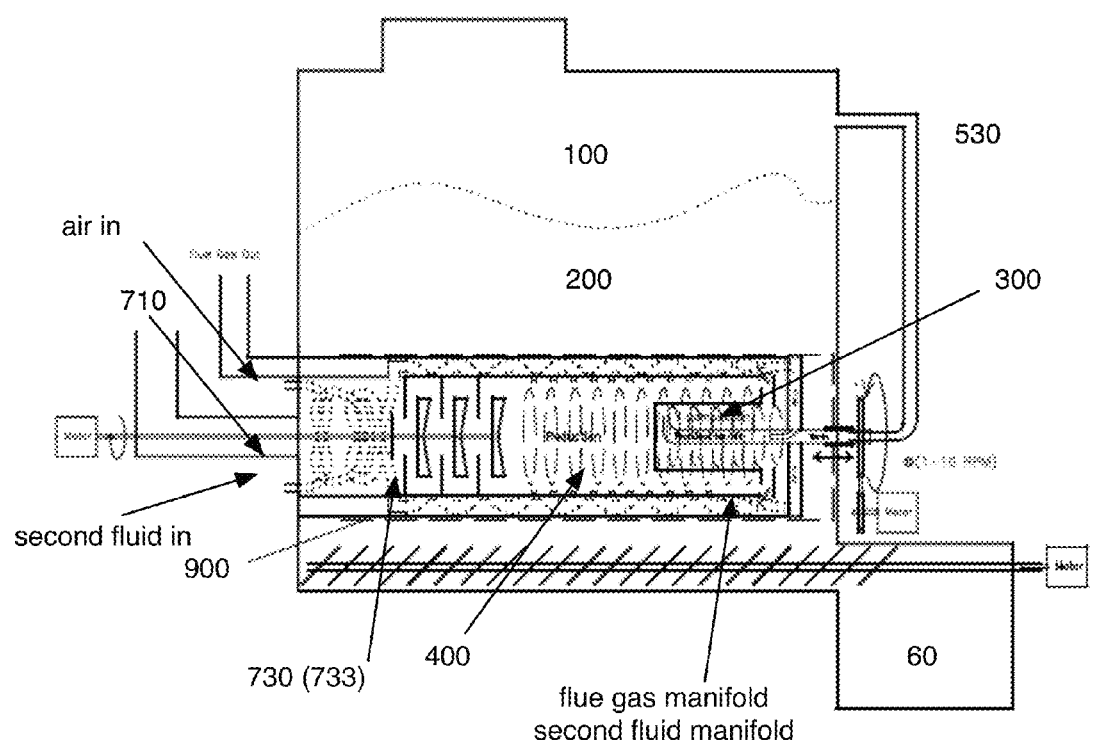
FIG. 12 is a tenth variation of the hybrid gasifier.
Figure 13:
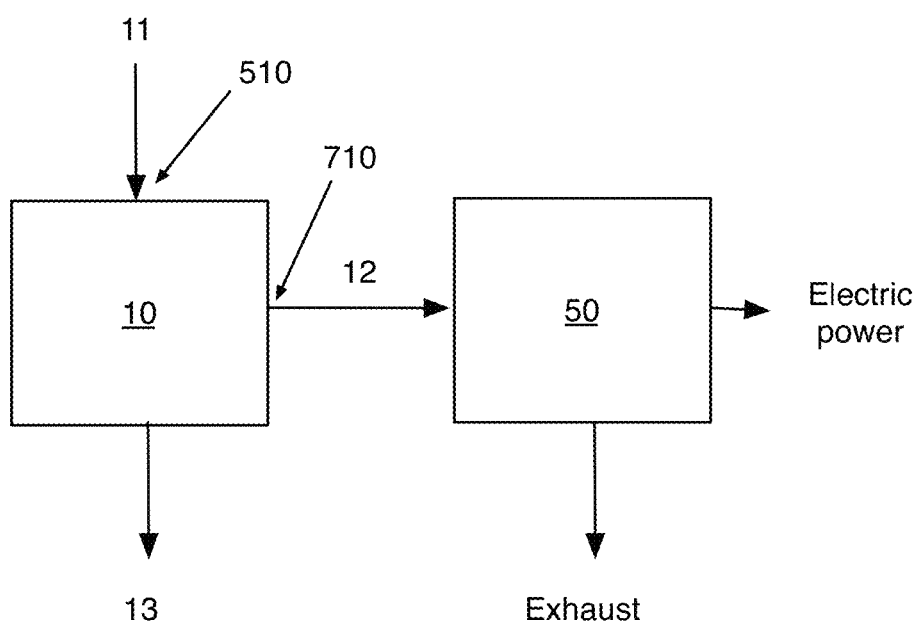
FIG. 13 is schematic representation of hybrid gasifier operation within an engine-generator system.

In a ninth example of the hybrid gasifier 10 as shown in FIG. 12, the hybrid gasifier 10 is a cyclonic gasifier that is oriented at an angle to a gravity vector, more preferably oriented perpendicular (e.g., horizontal) to the gravity vector. The gasifier includes a casing 500, a channel arranged coaxially within the casing 500 and extending horizontally along a portion of the casing width from the first end of the casing 500, a combustion container arranged in the end of the channel proximal the second end of the casing 500, a first air manifold 600 that introduces air into the combustion chamber, and a flue gas manifold extending from the combustion container, more preferably along the channel length toward the first end of the casing 500. The channel interior is preferably fluidly connected to the space between the channel and the casing 500. The first air manifold 600 is preferably angled relative to the channel longitudinal axis, and preferably introduces air tangentially into the combustion chamber such that a rotary flow is induced. The gasifier can additionally include a tar recycling manifold fluidly connecting a portion of the casing 500 above the channel (e.g., along a gravity vector) to the combustion container. The gasifier can additionally include an indirect gasification mechanism that functions to remove combusted tar gas from the gasifier prior to reduction, and to use the heat from the combusted tar gas to heat a second fluid stream (usually steam) that is used to reduce the char into fuel. Indirect gasification can be achieved by the following combination of elements. A combustion container fluidly separates the combustion zone 300 from the reduction zone 400, with the combustion container arranged within the end of the channel proximal the second closed end of the casing 500. The combustion container can be static or mobile. The combustion container is preferably arranged within the channel such that a char inlet is created between the channel and the combustion container (e.g., the channel interior is fluidly connected to the pyrolysis zone 200). The combustion container preferably has an outlet fluidly connected to a flue gas manifold. The flue gas manifold is preferably thermally connected to a second fluid manifold. The second fluid manifold is preferably fluidly connected to the channel interior (e.g., the reduction zone 400). The second fluid manifold can only transfer the second fluid or can transfer the second fluid and an oxygen-laden fluid source (e.g., ambient air). The second fluid manifold and flue gas manifold are preferably arranged such that cross-flow is induced between the respectively contained fluids, but can be alternatively arranged. In operation, tar gas is extracted from the gasifier (e.g., from a point above the pyrolysis zone 200, relative to a gravity vector) and fed into the combustion container. The tar gas is combusted within the combustion container and the resultant gas flows into the flue gas manifold, wherein the flue gas exchanges heat with the incoming second fluid (e.g., steam). The second fluid flows into the reduction zone 400 (e.g., channel interior) and is reduced into gaseous fuel, which preferably subsequently flows out of the gasifier through a fuel outlet. The gasifier can additionally include a particulate separation mechanism 730, such as a rotary blower, arranged within the first end of the channel, wherein the rotary blower recycles char toward the second fluid manifold inlet within the channel interior. The gasifier can additionally include a char grinder encircling the channel, for in-situ size reduction of feedstock, wherein the char grinder is preferably driven by a motor. The gasifier can additionally include a char removal mechanism 60 arranged below the channel, so as to remove char before it enters the reaction zone for an external use (such as biochar).

As a person skilled in the art will recognize from the previous detailed description and from the figures and claims, modifications and changes can be made to the preferred embodiments of the invention without departing from the scope of this invention defined in the following claims.

I claim:

1. A gasifier comprising:
    a casing comprising a first end and a second end, the casing defining a first lumen, the first end comprising a solid fuel inlet fluidly connected to the first lumen, the lumen defining a fluidly continuous drying zone and pyrolysis zone;
    a kinetic channel defining a kinetic bed reduction zone, the kinetic channel comprising:
        a fluid inlet arranged within the first lumen proximal the second end;
        a gas outlet distal the second end; and
        a body at least partially surrounded by the casing, the body extending between the fluid inlet and the gas outlet, the body comprising a length, the body defining a gaseous path fluidly separated from and thermally connected to the first lumen along the length;
    an air manifold proximal the fluid inlet and fluidly connected to a combustion zone, the combustion zone defined within the first lumen between the second end and a portion of the kinetic channel, the combustion zone fluidly connected to the reduction zone by the fluid inlet;
    a combustion mechanism thermally connected to the combustion zone; and
    a grinding mechanism surrounding the combustion zone.

2. The gasifier of claim 1, wherein the kinetic channel extends from first end toward the second end.

3. The gasifier of claim 2, wherein the casing is arranged with the first end above the second end along a gravity vector.

4. The gasifier of claim 1, wherein the air manifold extends along the body of the kinetic channel.

5. The gasifier of claim 1, further comprising an air guide fluidly connected to an outlet of the air manifold and arranged within the first lumen, the air guide defining a portion of the combustion zone, the air guide comprising a closed end distal the fluid inlet and an open end proximal the fluid inlet, the air manifold arranged to direct fluid into the air guide in a direction tangential to a radius extending at an angle from a longitudinal axis of the kinetic channel.

6. The gasifier of claim 5, wherein the air manifold is fluidly connected to the air guide proximal the closed end of the air guide.

7. The gasifier of claim 5, wherein the fluid inlet is tapered toward the longitudinal axis of the kinetic channel.

8. The gasifier of claim 7, wherein the air guide surrounds a portion of the kinetic channel proximal the fluid inlet, wherein the closed end of the air guide is sealed against the kinetic channel between the gas outlet and the fluid inlet, wherein the air guide and kinetic channel cooperatively define the portion of the combustion zone therebetween to generate swirled flow within the combustion zone, the swirled flow comprising a vector directed toward the fluid inlet of the kinetic channel.

9. The gasifier of claim 8, wherein the swirled flow generates a rotary flow within the reduction zone.

10. The gasifier of claim 1, wherein the fluidization channel further comprises a particulate separation mechanism arranged within the kinetic channel.

11. The gasifier of claim 10, wherein the particulate separation mechanism comprises a blower arranged proximal the gas outlet and configured to apply a centrifugal force on the fluid within the kinetic channel by generating a rotating flow within the kinetic channel about a longitudinal axis of the kinetic channel.

12. The gasifier of claim 11, further comprising a rotational flow generator configured to generate a second rotational flow within the combustion zone, the rotational flow comprising a vector extending toward the fluid inlet, wherein the first and second rotational flow are coaxial and codirectional.

13. The gasifier of claim 1, wherein the grinding mechanism comprises:
    an abrading body proximal the combustion zone;
    an abrading cage configured to translate along a surface of the body, the abrading cage comprising a second set of apertures having a second dimension larger than the first dimension, the abrading cage arranged proximal the pyrolysis zone; and
    a translation mechanism connected to the abrading cage and configured to control abrading cage translation relative to the body.

14. A gasification system comprising:
    a casing defining:
        a solid material inlet;
        a fixed bed drying zone proximal the solid material inlet;
        a fixed bed pyrolysis zone arranged below the drying zone along a gravity vector, distal the solid material inlet across the pyrolysis zone;
        a kinetic bed combustion zone surrounded by the pyrolysis zone;
    a kinetic channel extending through the drying zone and pyrolysis zone and fluidly connected to the combustion zone, the kinetic channel defining a kinetic bed reduction zone fluidly isolated from and thermally connected to the pyrolysis zone and the drying zone by the kinetic channel; and
    a grinding mechanism disposed across a material path between the pyrolysis zone and the combustion zone.

* * * * *